US012573531B2

(12) United States Patent
Inaba

(10) Patent No.: US 12,573,531 B2
(45) Date of Patent: Mar. 10, 2026

(54) CORE PIECE, REACTOR, CONVERTER, AND POWER CONVERSION APPARATUS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kazuhiro Inaba, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 365 days.

(21) Appl. No.: 18/282,786

(22) PCT Filed: Mar. 11, 2022

(86) PCT No.: PCT/JP2022/010880
§ 371 (c)(1),
(2) Date: Sep. 18, 2023

(87) PCT Pub. No.: WO2022/209759
PCT Pub. Date: Oct. 6, 2022

(65) Prior Publication Data

US 2024/0170193 A1 May 23, 2024

(30) Foreign Application Priority Data

Mar. 29, 2021 (JP) ................................ 2021-055052

(51) Int. Cl.

| | |
|---|---|
| ***H01F 3/14*** | (2006.01) |
| ***H01F 3/08*** | (2006.01) |
| ***H01F 17/04*** | (2006.01) |
| ***H01F 27/255*** | (2006.01) |

(52) U.S. Cl.
CPC ................ *H01F 3/14* (2013.01); *H01F 3/08* (2013.01); *H01F 17/045* (2013.01); *H01F 27/255* (2013.01)

(58) Field of Classification Search
CPC ........ H01F 3/08; H01F 17/045; H01F 27/255; H01F 3/14; H01F 2003/106; H01F 37/00
See application file for complete search history.

(56) References Cited

U.S. PATENT DOCUMENTS

| | | | | |
|---|---|---|---|---|
| 2002/0097131 A1* | 7/2002 | Kondo | .................... | H01F 37/00 336/212 |
| 2017/0154719 A1 | 6/2017 | Inaba | | |
| 2020/0381163 A1 | 12/2020 | Misaki et al. | | |

FOREIGN PATENT DOCUMENTS

| | | | | |
|---|---|---|---|---|
| CN | 108122662 A * | 6/2018 | ......... | H01F 27/2823 |
| JP | 2017-189933 A | 10/2017 | | |
| WO | WO-2015199044 A1 * | 12/2015 | ............... | H01F 3/08 |

OTHER PUBLICATIONS

International Search Report issued on Jul. 5, 2022 for WO 2022/209759 A1 (4 pages).

* cited by examiner

*Primary Examiner* — Mohamad A Musleh
(74) *Attorney, Agent, or Firm* — Venjuris, P.C.

(57) ABSTRACT

A core piece of the present invention is constituted by a molded body of a composite material in which a soft magnetic powder is dispersed in a resin. The core piece includes an end core portion configured to face an end face of a coil. The end core portion includes a recessed portion provided outside the coil, and a gate mark provided at a bottom portion of the recessed portion. An end face of the gate mark is located inside the recessed portion.

10 Claims, 13 Drawing Sheets

CORE PIECE, REACTOR, CONVERTER, AND POWER CONVERSION APPARATUS

CROSS REFERENCE TO RELATED APPLICATIONS

This application is a national phase of PCT application No. PCT/JP2022/010880, filed on 11 Mar. 2022, which claims priority from Japanese patent application No. 2021-055052, filed on 29 Mar. 2021, all of which are incorporated herein by reference.

TECHNICAL FIELD

The present disclosure relates to a core piece, a reactor, a converter, and a power conversion device.

BACKGROUND

A reactor disclosed in Patent Document 1 includes a coil, a magnetic core, and a molded resin portion. The coil includes a winding portion formed by winding a coil wire. The coil wire is a coated wire. A coated wire includes a conductor and an insulating coating that surrounds the conductor. The magnetic core is obtained by combining a plurality of core pieces. Patent Document 1 discloses that, among the core pieces, the core pieces arranged outside the coil may be constituted by a composite material molded body. The molded resin portion covers an assembly of the coil and the magnetic core.

PRIOR ART DOCUMENT

Patent Document

Patent Document 1: JP 2020-194923 A

SUMMARY OF THE INVENTION

A core piece according to an aspect of the present disclosure is constituted by a molded body of a composite material in which a soft magnetic powder is dispersed in a resin, the core piece including: an end core portion configured to face an end face of a coil, wherein the end core portion includes: a recessed portion provided outside the coil; and a gate mark provided at a bottom portion of the recessed portion, and an end face of the gate mark is located inside the recessed portion.

A reactor according to an aspect of the present disclosure includes a coil and a magnetic core, the reactor including: a molded resin portion covering at least a portion of the magnetic core, wherein the magnetic core includes the core piece according to an aspect of the present disclosure.

A converter according to an aspect of the present disclosure includes the reactor according to an aspect of the present disclosure.

A power conversion device according to an aspect of the present disclosure includes the converter according to an aspect of the present disclosure.

DETAILED DESCRIPTION TO EXECUTE THE INVENTION

Technical Problem

Figure 1:
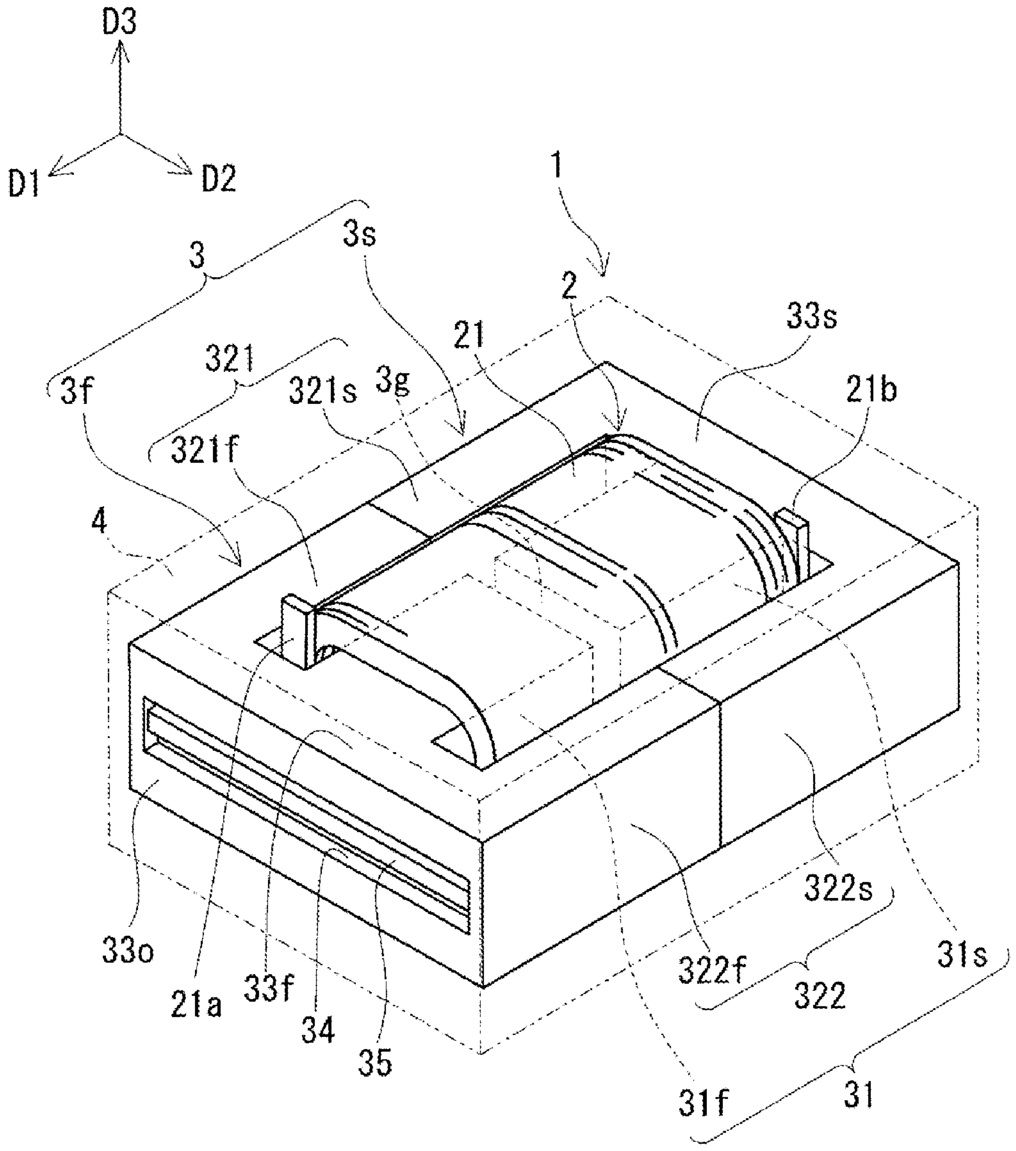
FIG. 1 is a perspective view showing an overview of a reactor according to a first embodiment.

The reactor described above is manufactured as follows. A raw material for the molded resin portion is poured into a mold in which the assembly has been placed. The raw material is a fluid resin. The resin is then solidified. It was found that in a reactor manufactured in this way, the insulating coating of the coil may become damaged.

One object of the present disclosure is to provide a core piece that, when constructing a reactor that includes a molded resin portion, is likely to suppress damage to the insulating coating of a coil provided in the reactor. Another object of the present disclosure is to provide a reactor that includes such a core piece. Another object of the present disclosure is to provide a converter that includes such a reactor, and a power conversion device that includes such a converter.

Advantageous Effects of Present Disclosure

When constructing a reactor that includes a molded resin portion, the core piece according to an aspect of the present disclosure is likely to suppress damage to the insulating coating of a coil provided in the reactor.

The reactor according to an aspect of the present disclosure is excellent in terms of productivity.

The converter according to an aspect of the present disclosure and the power conversion device according to an aspect of the present disclosure are excellent in terms of productivity.

Description of Embodiments of Present Disclosure

The inventor of the present invention investigated the cause of damage to the insulating coating of a coil when constructing a reactor that includes a molded resin portion. As a result, the following findings were obtained.

A core piece constituted by a composite material molded body is manufactured as follows. A raw material for the composite material molded body is poured into a mold through a gate. The raw material is a fluid material in which a soft magnetic powder is dispersed in an unsolidified resin. The raw material resin is then solidified.

Solidifying the resin obtains a first molded body in which an appendage having a portion that corresponds to the gate is connected to a main body portion having a shape that corresponds to the mold. In addition to the portion that corresponds to the gate, the appendage may have a portion that corresponds to the sprue, and may also have a portion that corresponds to the runner. The appendage is removed from the first molded body. Removal of the appendage can be performed by breaking off the appendage, for example. The core piece is constituted by the main body portion from which the appendage has been removed. A gate mark in the form of a protruding projection or ridge remains on the surface of the core piece from which the appendage has been removed. Soft magnetic particles may be locally exposed at the end face of the gate mark.

As described above, the reactor is manufactured by pouring a raw material for the molded resin portion into a mold in which an assembly of the magnetic core and the coil has been placed. The raw material is a fluid resin. In the mold, the raw material flows from the outside of the assembly to the inside of the coil.

The flowing raw material for the molded resin portion and the end face of the gate mark come into contact with each other. As a result of this contact, the soft magnetic particles exposed at the end face of the gate mark are likely to become detached. Since the gate mark protrudes from the surface of the core piece, the detached soft magnetic particles are likely to flow into the coil along with the flow of the raw material. The flowing soft magnetic particles rub against the coil wire that constitutes the coil. Also, the flowing soft magnetic particles become sandwiched between adjacent turns of the coil. When the coil vibrates, the sandwiched soft magnetic particles rub against the coil wire. Such friction between the soft magnetic particles and the coil wire may damage the insulating coating of the coil wire.

The present invention has been made based on the above findings. First, embodiments of the present disclosure will be listed and described.

(1) A core piece according to an aspect of the present disclosure is constituted by a molded body of a composite material in which a soft magnetic powder is dispersed in a resin, the core piece including: an end core portion configured to face an end face of a coil, wherein the end core portion includes: a recessed portion provided outside the coil; and a gate mark provided at a bottom portion of the recessed portion, and an end face of the gate mark is located inside the recessed portion.

When constructing a reactor that includes a molded resin portion, the above-described core piece is likely to suppress damage to the insulating coating of a coil provided in the reactor. Due to the end face of the gate mark being located inside the recessed portion, even if soft magnetic particles exposed from the end face of the gate mark become detached due to contact between the flowing raw material for the molded resin portion and the end face, the detached soft magnetic particles can accumulate in the bottom portion of the recessed portion. This thus suppresses the case where detached soft magnetic particles flow into the coil along with the flow of the raw material for the molded resin portion. Therefore, rubbing between detached soft magnetic particles and the coil is suppressed.

(2) The core piece according to the above aspect may have a configuration in which the end core portion further includes: an inward face configured to face an end face of the coil; and an outward face provided on a side opposite to the inward face, and the recessed portion and the gate mark are provided in the outward face.

The gate mark provided in the outward face of the end core portion is likely to come into contact with the flowing raw material for the molded resin portion. Therefore, soft magnetic particles are likely to become detached from the end face of the gate mark.

Even if the core piece includes the gate mark in the outward face where soft magnetic materials are likely to become detached, the end face of the gate mark is located inside the recessed portion, thus making it unlikely for detached soft magnetic particles to flow into the coil.

(3) The core piece according to aspect (2) may further include: a middle core portion having a portion configured to be arranged inside the coil, wherein the recessed portion and the gate mark may be at least partially provided in a first region of the outward face, the first region being a region of the outward face corresponding to the middle core portion.

Magnetic flux flows from the middle core portion to the two ends of the end core portion. Alternatively, magnetic flux flowing from the two ends of the end core portion converges in the middle core portion. The first region is the location where the magnetic flux is divided or converges. For this reason, even if the recessed portion is provided, a decrease in the magnetic path area is suppressed due to the first region in which at least part of the recessed portion is provided.

The above-described core piece is excellent in terms of productivity. The location where the gate mark is provided is a location corresponding to the gate in the manufacturing process for the core piece. In other words, in the manufacturing process for the core piece, the raw material for the composite material molded body is supplied into the mold from a portion of the outward face of the end core portion that includes at least a region corresponding to the first region. For this reason, the raw material for the composite material molded body is likely to sufficiently spread throughout the mold. The core piece thus can be manufactured more easily.

(4) The core piece according to aspect (3) may have a configuration in which the core piece is E-shaped, the core piece includes: the end core portion; the middle core portion; and a first side core portion and a second side core portion that are arranged outward of the coil on opposite sides of the middle core portion, and the recessed portion and the gate mark have a length extending over an entire length of the outward face in a width direction, the width direction being a direction in which the middle core portion, the first side core portion, and the second side core portion are side by side.

The above-described core piece is even more excellent in terms of productivity. The length of the gate mark corresponds to the length of the gate in the manufacturing process for the core piece. In other words, in the manufacturing process for the core piece, the raw material for the composite material molded body is supplied into the mold through the gate whose length extends over the entire length of the outward face in the width direction. For this reason, the raw material for the composite material molded body is likely to sufficiently spread throughout the mold. The core piece thus can be manufactured more easily.

(5) The core piece according to aspect (2) may have a configuration in which the core piece is U-shaped or J-shaped, the core piece further includes: a first middle core portion having a portion configured to be arranged inside a first winding portion of the coil; and a second middle core portion having a portion configured to be arranged inside a second winding portion of the coil, and the recessed portion and the gate mark are at least partially provided in a first region of the outward face, the first region being a region of the outward face corresponding to a gap between the first middle core portion and the second middle core portion.

The above-described core piece is excellent in terms of productivity. This is because the raw material for the composite material molded body is likely to spread sufficiently throughout the mold in the manufacturing process, and thus the core piece is easy to manufacture.

(6) A reactor according to an aspect of the present disclosure includes a coil and a magnetic core, the reactor including: a molded resin portion covering at least a portion of the magnetic core, wherein the magnetic core includes the core piece according to any one of aspects (1) to (5).

The above-described reactor is excellent in terms of productivity due to including a core piece that is likely to suppress damage to the insulating coating of the coil during the manufacturing process as described above.

(7) The reactor according to the above aspect may have a configuration in which the magnetic core is a compound body that is a combination of a first core piece and a second core piece, and at least either the first core piece or the second core piece is the core piece according to any one of aspects (1) to (5).

The magnetic core can be constructed by combining the first core portion and the second core portion, and thus the reactor is excellent in terms of ease of work in manufacturing.

(8) The reactor according to the above aspect may have a configuration in which the core piece has a relative magnetic permeability of 5 or more and 50 or less.

According to the above-described reactor, the inductance can be adjusted easily.

(9) A converter according to aspect of the present disclosure includes the reactor according to any one of aspects (6) to (8).

Due to including the above-described reactor, the converter is excellent in terms of productivity.

(10) A power conversion device according to an aspect of the present disclosure includes the converter according to aspect (9).

Due to including the above-described converter, the power conversion device is excellent in terms of productivity.

Details of Embodiments of Present Disclosure

Details of embodiments of the present disclosure will be described below with reference to the drawings. Like reference numerals in the drawings indicate elements having like names.

First Embodiment

[Reactor]

A reactor 1 according to a first embodiment will be described below with reference to FIGS. 1 to 5. The reactor 1 includes a coil 2, a magnetic core 3, and a molded resin portion 4. The molded resin portion 4 covers at least portion of the magnetic core 3. One feature of the reactor 1 of the present embodiment is that the magnetic core 3 includes a specific core piece. Configurations will be described in detail below.

Figure 3:
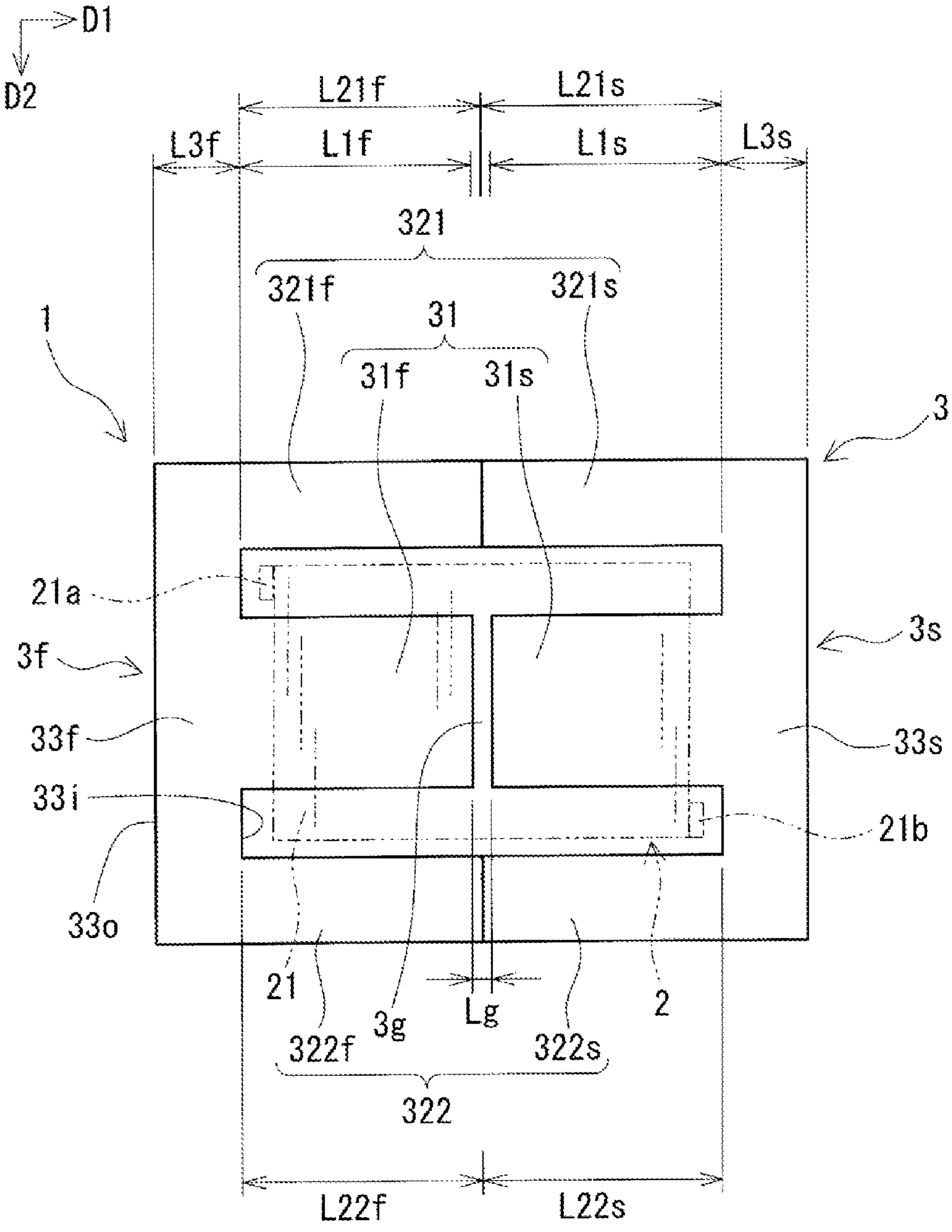
FIG. 3 is a top view showing an overview of the reactor according to the first embodiment.

In FIG. 1, the molded resin portion 4 is shown with a dashed double-dotted line for convenience in the description. In FIG. 3, for convenience in the description, the molded resin portion 4 is omitted, and the coil 2 is shown with a dashed double-dotted line. The molded resin portion 4 is similarly shown with a dashed double-dotted line in FIG. 8 referenced in a fourth embodiment described later. The molded resin portion 4 similarly omitted and the coil 2 is similarly shown with a dashed double-dotted line in FIGS. 6 and 7 referenced in second and third embodiments described later, as well as in FIGS. 10, 12, and 13 referenced in fourth to sixth embodiments described later.

[Coil]

Figure 2:
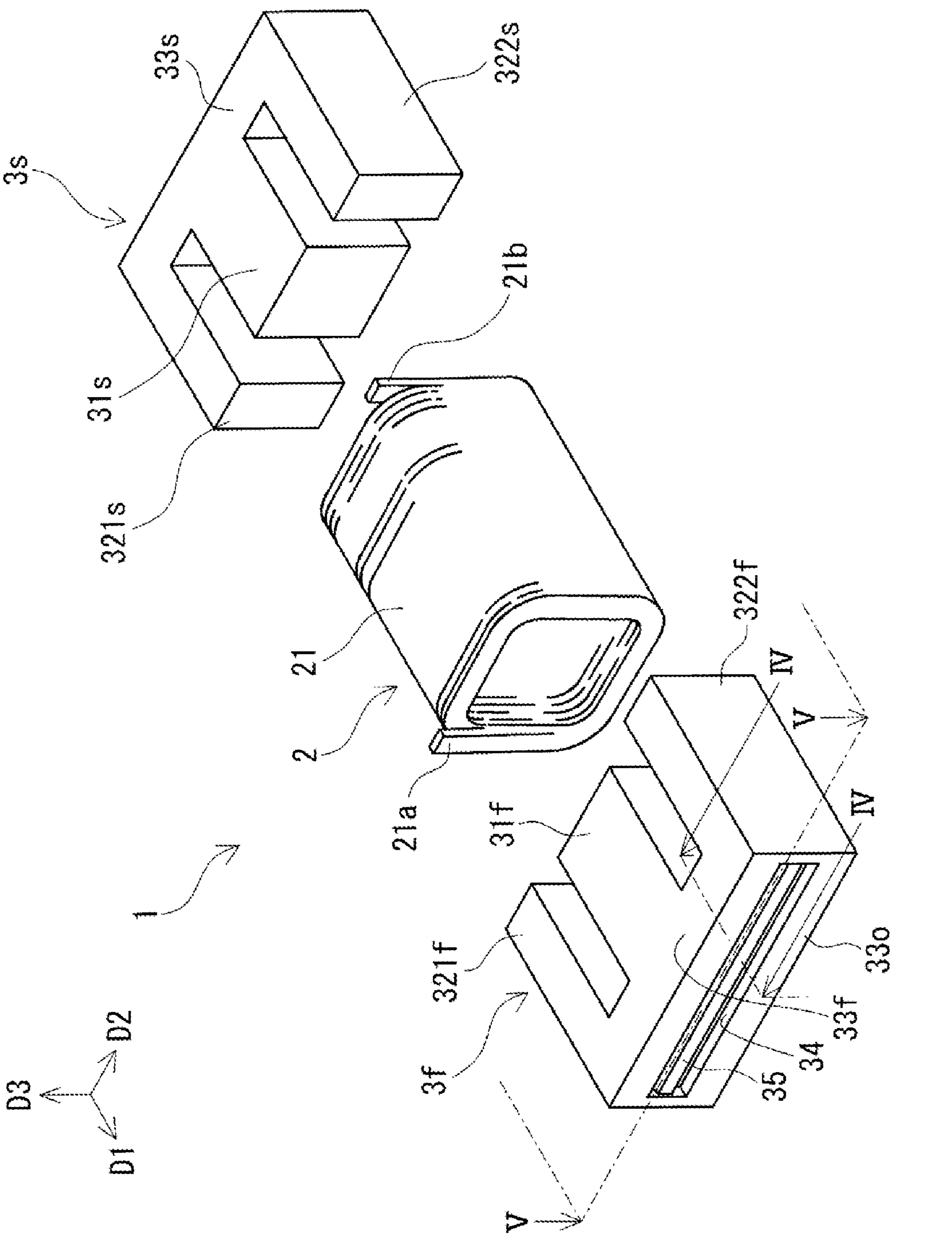
FIG. 2 is a perspective view showing an overview of an exploded state of the reactor according to the first embodiment.

In the present embodiment, the coil 2 includes one hollow winding portion 21 as shown in FIGS. 1 and 2. One winding portion 21 may be provided as in the present embodiment, or two may be provided as in a fourth embodiment described later with reference to FIGS. 8 and 9. Compared with the reactor 1 of the fourth embodiment in which two winding portions are arranged side by side in a direction orthogonal to the axial direction of the winding portions, the reactor 1 of the present embodiment including one winding portion 21 can have a shorter length along a later-described second direction D2 while the winding portion 21 has the same cross-sectional area and the same number of turns.

The winding portion 21 may have a rectangular tubular shape or a circular tubular shape. A rectangular shape may also be a square shape. The winding portion 21 of the present embodiment has a rectangular tubular shape, as shown in FIG. 2. In other words, the end faces of the winding portion 21 have a rectangular frame shape. Due to the winding portion 21 having a rectangular tubular shape, the area of contact between the winding portion 21 and the installation target can be increased more easily than in the case where the winding portion 21 has a circular tubular shape with the same cross-sectional area. For this reason, the reactor 1 can easily dissipate heat to the installation target via the winding portion 21. Moreover, the winding portion 21 can be easily installed stably on the installation target. The corners of the winding portion 21 are rounded.

The winding portion 21 of the present embodiment is configured by winding a single coil wire into a spiral without a joint. A known coil wire can be used for the coil wire. A covered flat wire is used as the coil wire of the present embodiment. The conductor wire of the covered flat wire is constituted by a copper flat wire. The insulating coating of the covered flat wire is made of enamel. The winding portion 21 is constituted by an edgewise coil obtained by winding the covered flat wire edgewise.

In the present embodiment, a first end portion 21*a* and a second end portion 21*b* of the winding portion 21 are drawn circumferentially outward from the winding portion 21 at one end and the other end, respectively, in the axial direction of the winding portion 21. Although not shown, the insulating coating is stripped from the first end portion 21*a* and the second end portion 21*b* of the winding portion 21 to expose the conductor wire. In the present embodiment, the exposed portions of the conductor wire are drawn out of a later-described molded resin portion 4 and are connected to terminal members. The terminal members are not shown. An external device is connected to the coil 2 via the terminal members. The external device is not shown. The external device is a power source that supplies electrical power to the coil 2, for example.

[Magnetic Core]

The configuration of the magnetic core 3 can be appropriately selected in accordance with the number of winding portions 21 of the coil 2. As shown in FIG. 1, the magnetic core 3 of the present embodiment includes a middle core portion 31, a first side core portion 321, a second side core portion 322, a first end core portion 33*f*, and a second end core portion 33*s*. In the magnetic core 3, the direction along the axial direction of the winding portion 21 is a first direction D1, the direction in which the middle core portion 31, the first side core portion 321, and the second side core portion 322 are side by side is a second direction D2, and the direction orthogonal to the first direction D1 and the second direction D2 is a third direction D3.

[Middle Core Portion]

The middle core portion 31 has a portion located inside the winding portion 21. The middle core portion 31 has a shape corresponding to the inner peripheral shape of the winding portion 21, for example. In the present embodiment, the middle core portion 31 is shaped as a quadrangular prism as shown in FIG. 2. The corners of the middle core portion 31 may be rounded along the inner peripheral surface of the corners of the winding portion 21.

The length of the middle core portion 31 along the first direction D1 is substantially equivalent to the length of the winding portion 21 along the axial direction, as shown in FIG. 3. The length of the middle core portion 31 along the first direction D1 is a sum length L1*f*+L1*s*, that is to say the sum of a length L1*f* of the first middle core portion 31*f* along the first direction D1 and a length L1*s* of the second middle core portion 31*s* along the first direction D1, which will be described later. The length of the middle core portion 31 along the first direction D1 does not include a length Lg of a later-described gap portion 3*g* along the first direction D1. This similarly applies to the other core portions and the lengths of the other core portions.

In the present embodiment, the length of the middle core portion 31 along the first direction D1 is shorter than the length of the first side core portion 321 along the first direction D1 and the length of the second side core portion 322 along the first direction D1. The length of the first side core portion 321 along the first direction D1 is a sum length L21*f*+L21*s*, that is to say the sum of a length L21*f* of the first side core portion 321*f* along the first direction D1 and a length L21*s* of the first side core portion 321*s* along the first direction D1, which will be described later. The length of the second side core portion 322 along the first direction D1 is a sum length L22*f*+L22*s*, that is to say the sum of a length L22*f* of the second side core portion 322*f* along the first direction D1 and a length L22*s* of the second side core portion 322*s* along the first direction D1, which will be described later.

As an alternative to the present embodiment, the length of the middle core portion 31 along the first direction D1 may be equivalent to the length of the first side core portion 321 along the first direction D1 and the length of the second side core portion 322 along the first direction D1.

The middle core portion 31 may be constituted by two core portions, namely a first middle core portion 31*f* and a second middle core portion 31*s* as in the present embodiment, for example. Although not shown, the middle core portion 31 may be constituted by only the first middle core portion 31*f*.

[First Side Core Portion and Second Side Core Portion]

As shown in FIG. 1, the first side core portion 321 and the second side core portion 322 are arranged facing each other while sandwiching the middle core portion 31 therebetween. The first side core portion 321 and the second side core portion 322 are arranged on the outer periphery of the winding portion 21. The first side core portion 321 and the second side core portion 322 have the same shape, which is a thin prismatic shape in the present embodiment.

The length of the first side core portion 321 (L21*f*+L21*s*) and the length of the second side core portion 322 (L22*f*+L22*s*) are longer than the length of the winding portion 21 along the axial direction, as shown in FIG. 3. Note that the length of the first side core portion 321 along the first direction D1 and the length of the second side core portion 322 along the first direction D1 may be equivalent to the length of the winding portion 21 along the axial direction.

The first side core portion 321 may be constituted by two core portions, namely a first side core portion 321*f* and a first side core portion 321*s* as in the present embodiment, for example. The first side core portion 321 may be constituted by only the first side core portion 321*f* as in a third embodiment. The second side core portion 322 may be constituted by two core portions, namely a second side core portion 322*f* and a second side core portion 322*s* as in the present embodiment, for example. The second side core portion 322 may be constituted by only the second side core portion 322*f* as in the third embodiment.

In the present embodiment, the sum of the cross-sectional area of the first side core portion 321 and the cross-sectional area of the second side core portion 322 is the same as the cross-sectional area of the middle core portion 31. In the present embodiment, the middle core portion 31, the first side core portion 321, and the second side core portion 322 have the same length along the third direction D3. In other words, the sum of the length of the first side core portion 321 along the second direction D2 and the length of the second side core portion 322 along the second direction D2 corresponds to the length of the middle core portion 31 along the second direction D2. The length of the first side core portion 321 along the second direction D2 and the length of the second side core portion 322 along the second direction D2 are ½ the length of the middle core portion 31 along the second direction D2.

(First End Core Portion and Second End Core Portion)

The first end core portion 33*f* faces a first end face of the winding portion 21. The second end core portion 33*s* faces a second end face of the winding portion 21. Here, "faces" means that an inward face 33*i* of the first end core portion 33*f* and the first end face of the winding portion 21 face each other. This also means that the inward face of the second end core portion 33*s* and the second end face of the winding portion 21 face each other. In the present embodiment, the shape of the first end core portion 33*f* and the shape of the second end core portion 33*s* are thin prismatic shapes, as shown in FIGS. 1 and 2.

(First Core Piece and Second Core Piece)

In the present embodiment, the magnetic core 3 is a compound body that is a combination of a first core piece 3*f* and a second core piece 3*s*. Various combinations of the first core piece 3*f* and the second core piece 3*s* can be obtained by appropriately selecting the shapes of the first core piece 3*f* and the second core piece 3*s*. The shape of the first core piece 3*f* and the shape of the second core piece 3*s* may be asymmetrical as in the present embodiment, or may be symmetrical as in a second embodiment. Here, "asymmetrical" means having different shapes. Also, "symmetrical" means having the same shape and size.

In the present embodiment, the first core piece 3f and the second core piece 3s are divided in the first direction D1 as shown in FIG. 3. In the present embodiment, the combination of the first core piece 3f and the second core piece 3s is of the E-E type. Combinations different from that of the present embodiment will be described later. Since the reactor 1 can be constructed by the first core piece 3f and the second core piece 3s being combined with the winding portion 21 along the axial direction of the winding portion 21, the ease of work in manufacturing is excellent.

A gap portion 3g, which will be described later, may be provided between the first core piece 3f and the second core piece 3s, or the gap portion 3g may not be provided.

The E-shaped first core piece 3f of the present embodiment includes the first middle core portion 31f, the first side core portion 321f, the second side core portion 322f, and the first end core portion 33f. The first middle core portion 31f constitutes a portion of the middle core portion 31. The first side core portion 321f constitutes a portion of the first side core portion 321. The second side core portion 322f constitutes a portion of the second side core portion 322. The first core piece 3f is a molded body in which the first middle core portion 31f, the first side core portion 321f, the second side core portion 322f, and the first end core portion 33f are integrated with each other.

The first end core portion 33f has an inward face 33i and an outward face 33o. The inward face 33i of the first end core portion 33f is the face that faces the first end face of the winding portion 21 as described above. The outward face 33o of the first end core portion 33f is the face provided on the side opposite to the inward face 33i in the first direction D1. The outer peripheral faces of the first middle core portion 31f, the first side core portion 321f, and the second side core portion 322f are connected to the inward face 33i of the first end core portion 33f. The first side core portion 321f and the second side core portion 322f are provided at respective ends of the first end core portion 33f in the second direction D2. The first middle core portion 31f is provided at the center of the first end core portion 33f in the second direction D2.

As described above, the second core piece 3s of the present embodiment, which is E-shaped and asymmetric with the first core piece 3f, includes the second middle core portion 31s, the first side core portion 321s, the second side core portion 322s, and the second end core portion 33s. The second middle core portion 31s constitutes the remaining portion of the middle core portion 31. The first side core portion 321s constitutes the remaining portion of the first side core portion 321. The second side core portion 322s constitutes the remaining portion of the second side core portion 322. The second core piece 3s is a molded body in which the second middle core portion 31s, the first side core portion 321s, the second side core portion 322s, and the second end core portion 33s are integrated with each other. The positions and connections of the core portions in the second core piece 3s are the same as the positions and connections of the core portions in the first core piece 3f described above.

In the present embodiment, the first core piece 3f and the second core piece 3s are combined such that the end face of the first side core portion 321f and the end face of the first side core portion 321s are in contact with each other, and furthermore the end face of the second side core portion 322f and the end face of the second side core portion 322s are in contact with each other. A gap is provided between an end face of the first middle core portion 31f and an end face of the second middle core portion 31s. The length of this gap along the first direction D1 corresponds to a length Lg of the gap portion 3g along the first direction D1.

As an alternative to the present embodiment, the first core piece 3f and the second core piece 3s may be combined such that a gap is provided between the end face of the first side core portion 321f and the end face of the first side core portion 321s, and furthermore a gap is provided between the end face of the second side core portion 322f and the end face of the second side core portion 322s. If the length of the middle core portion 31 along the first direction D1 is shorter than the length of the first side core portion 321 along the first direction D1, a gap is also provided between the end face of the first middle core portion 31f and the end face of the second middle core portion 31s. In this case, the distance between the end face of the first middle core portion 31f and the end face of the second middle core portion 31s is larger than the distance between the end face of the first side core portion 321f and the end face of the first side core portion 321s, and also the distance between the end face of the second side core portion 322f and the end face of the second side core portion 322s. It is preferable that the first core piece 3f and the second core piece 3s are combined with each other using the molded resin portion 4, which will be described later.

(Recessed Portion and Gate Mark)

In the present embodiment, in the first end core portion 33f and the second end core portion 33s, the core pieces constituted by a composite material molded body include a recession portion 34 and a gate mark 35 as shown in FIGS. 1 and 2. As will be described later, in the present embodiment, all of the first core pieces 3f having the first end core portions 33f and all of the second core pieces 3s having the second end core portions 33s are constituted by a composite material molded body. In other words, in the present embodiment, both the first end core portion 33f and the second end core portion 33s include the recessed portion 34 and the gate mark 35. The recessed portion and the gate mark of the second end core portion 33s are not shown. In the present embodiment, the recessed portion 34 and the gate mark 35 of the first end core portion 33f and the recessed portion and the gate mark of the second end core portion 33s are the same as each other. The recessed portion 34 and the gate mark 35 of the first end core portion 33f will be described below as representatives.

Figure 4:
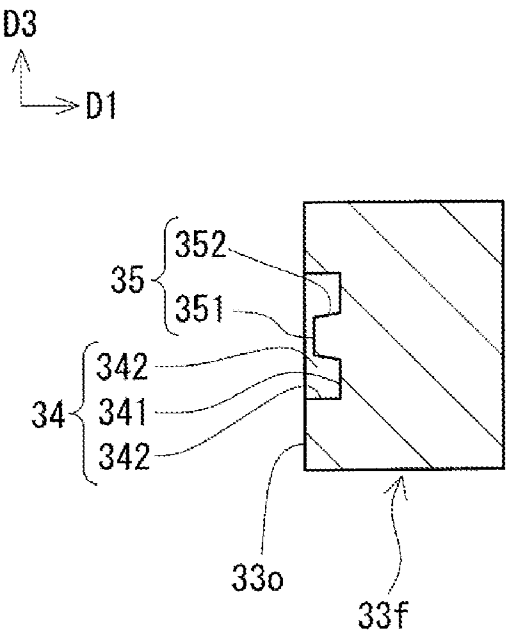
FIG. 4 is a cross-sectional view taken view along IV-IV in FIG. 2.
Figure 5:
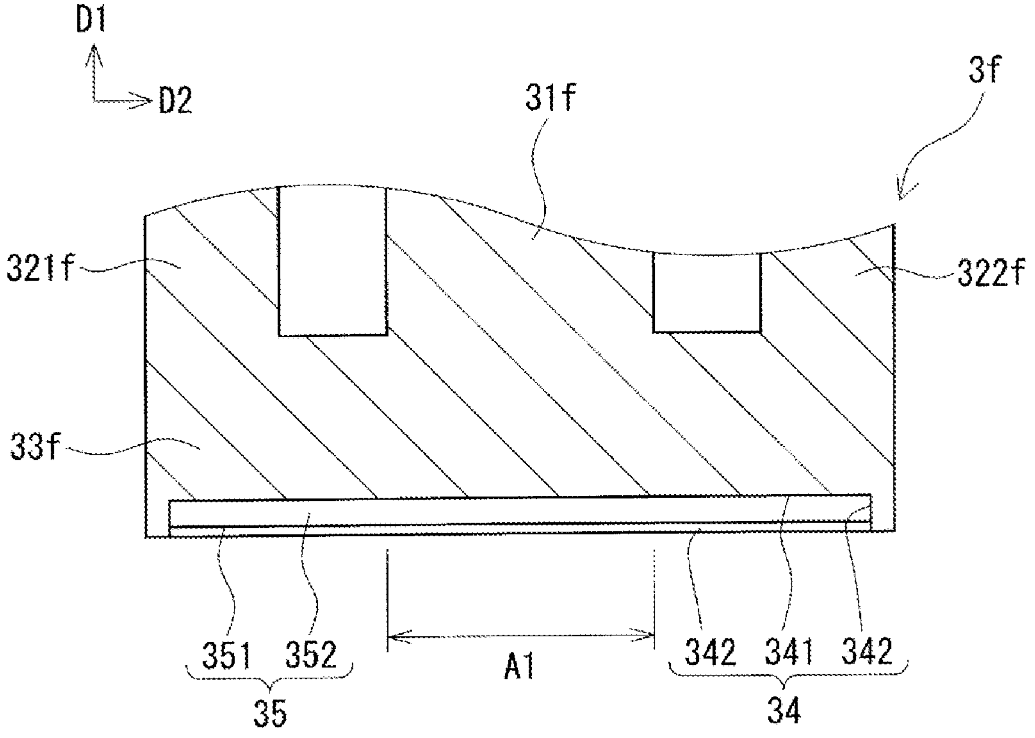
FIG. 5 is a cross-sectional view taken view along V-V in FIG. 2.

The gate mark 35 is a projection or a ridge formed when a later-described appendage is removed during the manufacturing process for the first core piece 3f. The gate mark 35 is located on a bottom portion 341 of the recessed portion 34, as shown in FIGS. 4 and 5.

An end face 351 of the gate mark 35 is located inside the recessed portion 34. Being located inside the recessed portion 34 means that the end face 351 of the gate mark 35 is located between the bottom portion 341 of the recessed portion 34 and a virtual plane defined by the outline of the opening of the recessed portion 34. In other words, the height of the gate mark 35 is less than the depth of the recessed portion 34. The height of the gate mark 35 refers to the distance between the bottom portion 341 of the recessed portion 34 and the end face 351 of the gate mark 35. The depth of the recessed portion 34 refers to the distance between the bottom portion 341 of the recessed portion 34 and the opening of the recessed portion 34.

The depth of the recessed portion 34 may be 1.05 times or more and 3.0 times or less the height of the gate mark 35. If the depth of the recessed portion 34 is 1.05 times or more the height of the gate mark 35, detached soft magnetic particles are likely to accumulate in the recessed portion 34, as will be described later in detail. If the depth of the recessed portion 34 is 3.0 times or less the height of the gate mark 35, the appendage can be easily removed during the manufacturing process. The depth of the recessed portion 34 may be 1.1 times or more and 2.0 times or less the height of the gate mark 35, or particularly 1.2 times or more and 1.5 times or less the height of the gate mark 35.

The recessed portion 34 and the gate mark 35 are provided in the outward face 33*o* of the first end core portion 33*f*. At least part of the recessed portion 34 and at least part of the gate mark 35 may be provided in a first region A1 shown in FIG. 5. The first region A1 is the region of the outward face 33*o* that corresponds to the first middle core portion 31*f*. The region that corresponds to the first middle core portion 31*f* is the region surrounded by a virtual outer peripheral face obtained by extending the outer peripheral surface of the first middle core portion 31*f* in the first direction D1. Magnetic flux flowing from the first middle core portion 31*f* is divided into streams flowing toward the two ends of the first end core portion 33*f*. Alternatively, magnetic flux flowing from the two ends of the first end core portion 33*f* converges in the first middle core portion 31*f*. The first region A1 is the location where the magnetic flux is divided or converges. For this reason, even if the recessed portion 34 is provided, a decrease in the magnetic path area is suppressed due to the first region A1 in which at least part of the recessed portion 34 is provided.

The gate mark 35 may extend along the second direction D2. The length of the gate mark 35 in the second direction D2 can be appropriately selected according to the shape and size of the first core piece 3*f*. With respect to the second direction D2, the two ends of the gate mark 35 are located at the two ends of the first region A1, or located between the two ends of the first region A1 and the two ends of the outward face 33*o*, or located at the two ends of the outward face 33*o*. The two ends of the outward face 33*o* in the second direction D2 do not include the corners connecting the outward face 33*o* to the side faces. For example, if the corners are curved surfaces, the two ends of the outward face 33*o* in the second direction D2 refer to portions of the outward face 33*o* connected to the corners.

With respect to the second direction D2, if the two ends of the gate mark 35 are located at the two ends of the first region A1, the length of the gate mark 35 is the total length of the first region A1 in the second direction D2. With respect to the second direction D2, if the two ends of the gate mark 35 are located between the two ends of the first region A1 and the two ends of the outward face 33*o*, the length of the gate mark 35 is greater than the total length of the first region A1 in the second direction D2, or less than the total length of the outward face 33*o* in the second direction D2. With respect to the second direction D2, if the two ends of the gate mark 35 are located at the two ends of the outward face 33*o*, the length of the gate mark 35 is the total length of the outward face 33*o* in the second direction D2.

If the length of the gate mark 35 is longer than the total length of the first region A1 in the second direction D2, the raw material for the composite material molded body is likely to spread uniformly over the first middle core portion 31*f*, the first side core portion 321*f*, and the second side core portion 322*f* in the manufacturing process. In particular, if the length of the gate mark 35 is the total length of the outward face 33*o* in the second direction D2, the effect of more uniform spreading of the raw material for the composite material molded body is exhibited even more. In the present embodiment, the length of the gate mark 35 is the total length of the outward face 33*o* in the second direction D2.

In the present embodiment, the length of the gate mark 35 is the same as the length of the recessed portion 34. In other words, in the present embodiment, as shown in FIG. 5, the end face 351 of the gate mark 35 is directly connected to an inner wall portion 342 of the recessed portion 34. As an alternative to the present embodiment, the length of the gate mark 35 may be shorter than the length of the recessed portion 34. In this case, the end face 351 of the gate mark 35 is not directly connected to the inner wall portion 342 of the recessed portion 34, and the gate mark 35 has an end portion that connects the end face 351 to the bottom portion 341 of the recessed portion 34.

The width of the gate mark 35 is shorter than the width of the recessed portion 34. The width is the length along the third direction D3. In other words, as shown in FIG. 4, the end face 351 of the gate mark 35 is not directly connected to the inner wall portion 342 of the recessed portion 34, and the gate mark 35 has a side wall portion 352 that connects the end face 351 to the bottom portion 341 of the recessed portion 34. This thus forms a space surrounded by the side wall portion 352 of the gate mark 35, the bottom portion 341 of the recessed portion 34, and the inner wall portion 342 of the recessed portion 34.

In the present embodiment, a lateral cross-section of the gate mark 35 is trapezoidal. The lateral cross-section is a cross section of the gate mark 35 taken along a plane orthogonal to the second direction D2. In other words, the side wall portion 352 of the gate mark 35 is constituted by a sloped face, and this sloped face is connected to the bottom portion 341 of the recessed portion 34. As an alternative to the present embodiment, the lateral cross-section of the gate mark 35 may be rectangular.

Materials

At least either the first core piece 3*f* or the second core piece 3*s* is constituted by a composite material molded body. The composite material molded body is obtained by dispersing a soft magnetic powder in resin. A method for manufacturing the composite material molded body will be described later. As described above, in the present embodiment, the first core piece 3*f* and the second core piece 3*s* are constituted by a composite material molded body. A configuration is possible in which the first core piece 3*f* is constituted by a composite material molded body, and the second core piece 3*s* is constituted by a power compact, as in the second embodiment. The powder compact will be described later. In the present embodiment, the first core piece 3*f* and the second core piece 3*s* are constituted by the same material. The first core piece 3*f* and the second core piece 3*s* may be constituted by different materials, as in the second embodiment. The different materials will be described later.

The soft magnetic particles constituting the soft magnetic powder are particles of a soft magnetic metal, coated particles that are particles of a soft magnetic metal coated with an insulating coating, or particles of a soft magnetic non-metal. Examples of soft magnetic metals include pure iron and an iron-based alloy. Examples of iron-based alloys include Fe—Si alloy and Fe—Ni alloy. The insulating coating is made of phosphate, for example. One example of a soft magnetic non-metal is ferrite.

The resin of the composite material is a thermosetting resin or a thermoplastic resin, for example. Examples of thermosetting resins include epoxy resins, phenol resins, silicone resins, and urethane resins. Examples of thermoplastic resins include polyphenylene sulfide resins, polyamide resins, liquid crystal polymers, polyimide resins, and fluorine resins. Examples of polyamide resins include nylon 6, nylon 66, and nylon 9 T.

The composite material molded body may contain a ceramic filler. Examples of ceramic fillers include alumina and silica.

The content of the soft magnetic powder in the molded body of the composite material is 20% by volume or more and 80% by volume or less, for example. The content of the resin in the composite material molded body is 20% by volume or more and 80% by volume or less, for example. These content ratios are values when the composite material is 100% by volume, for example.

The content of the soft magnetic powder in the composite material molded body is considered to be equivalent to the ratio of the area of the soft magnetic powder to the area of the lateral cross-section of the molded body. The content of the soft magnetic powder in the molded body is determined as follows. A cross-section of the molded body is observed with an SEM (Scanning Electron Microscope) to obtain an observation image. The magnification of the SEM is set from 200 to 500 times. Also, ten or more observation images are acquired. The total cross-sectional area is 0.1 cm 2 or more. One observation image may be acquired for each cross-section, or a plurality of observation images may be acquired for each cross-section. Image processing is performed on each acquired observation image to extract the outlines of particles. One example of the image processing is binarization processing. The area ratio of the soft magnetic particles is calculated for each observation image, and the average value of the area ratios is obtained. The average value is considered to be the content ratio of the soft magnetic powder.

A composite material molded body is manufactured as follows. A raw material for the composite material molded body is poured into a mold through a gate. The raw material is a fluid material in which a soft magnetic powder is dispersed in an unsolidified resin. The raw material resin is then solidified. The mold has a projection or a ridge protruding into the mold at a location that corresponds to the gate region. The projection or ridge forms the recessed portion 34 described above. Solidifying the resin obtains a first molded body in which an appendage having a portion that corresponds to the gate is connected to a main body portion having a shape that corresponds to the mold. In addition to having the portion that corresponds to the gate, the appendage may also have a portion that corresponds to the sprue, and may also have a portion that corresponds to the runner. The appendage of the first molded body is removed, thus leaving only the main body portion. Removal of the appendage can be performed by breaking off the appendage, for example. The remaining main body portion constitutes the core piece. Soft magnetic particles may be locally exposed at the location where the appendage of the core piece was removed, that is to say the gate mark 35.

The relative magnetic permeability of the first core piece 3*f* and the second core piece 3*s* may be 5 or more and 50 or less. The relative magnetic permeability of the first core piece 3*f* may be 5 or more and 45 or less, and particularly 5 or more and 40 or less. The relative magnetic permeability is obtained as follows. A ring-shaped measurement sample is cut out from both the first core piece 3*f* and the second core piece 3*s*. A coil wire is wound around each of the measurement samples, specifically 300 times on the primary side and 20 times on the secondary side. The B-H initial magnetization curve is measured in the range of H=0 (Oe) or more and 100 (Oe) or less, the highest value of the slope of the B-H initial magnetization curve is obtained, and that highest value is taken as the relative magnetic permeability. Note that the magnetization curve here is a so-called DC magnetization curve.

(Size)

The first core piece 3*f* and the second core piece 3*s* have the same size. The following describes the size of the first core piece 3*f* as a representative.

Among the length L1*f* of the first middle core portion 31*f*, the length L21*f* of the first side core portion 321*f*, and the length L22*f* of the second side core portion 322*f*, at least one of the lengths may be different, or all of the lengths may be the same. In the present embodiment, the length L21*f* and the length L22*f* are the same, and are longer than the length L1*f*. As an alternative to the present embodiment, the length L21*f* and the length L22*f* may be the same, and the length L1*f* may be longer than the length L21*f* and the length L22*f*.

The length of the first end core portion 33*f* along the second direction D2 is longer than the length of the winding portion 21 along the second direction D2, as shown in FIG. 3. The length of the first end core portion 33*f* along the third direction D3 is shorter than the length of the winding portion 21 along the third direction D3, as shown in FIG. 1. The length of the first end core portion 33*f* along the third direction D3 may be longer than or equal to the length of the winding portion 21 along the third direction D3.

(Gap Portion)

The gap portion 3*g* is constituted by a member made of a material having a smaller relative magnetic permeability than the first core piece 3*f* and the second core piece 3*s*. In the present embodiment, the gap portion 3*g* is constituted by a portion of the molded resin portion 4, which will be described later. As an alternative to the present embodiment, the gap portion 3*g* may be an air gap. The gap portion 3*g* may be arranged inside the winding portion 21 as in the present embodiment. The gap portion 3*g* of the present embodiment is provided between the first middle core portion 31*f* and the second middle core portion 31*s*. If the gap portion 3*g* is provided inside the winding portion 21, eddy current loss in the winding portion 21 caused by the entrance of leakage magnetic flux into the winding portion 21 can be reduced more easily than in the case of being provided outside the winding portion 21. Due to the gap portion 3*g* being provided inside the winding portion 21, leakage magnetic flux from the gap portion 3*g* is less likely to leak out from the winding portion 21 than in the case of being provided outside the winding portion 21, and thus an increase in loss is suppressed.

[Molded Resin Portion]

The molded resin portion 4 covers at least a portion of the magnetic core 3. The molded resin portion 4 protects the covered portion from the external environment. At least a portion of the magnetic core 3 covered with the molded resin portion 4 is the recessed portion 34 and the gate mark 35 described above, for example. The molded resin portion 4 of the present embodiment covers the outer surface of an assembly of the coil 2 and the magnetic core 3. The coil 2 and the magnetic core 3 are integrated by the molded resin portion 4. The molded resin portion 4 of the present embodiment is provided between the first middle core portion 31*f* and the second middle core portion 31*s* and the coil 2, and between the first middle core portion 31*f* and the second middle core portion 31*s*. The portion of the molded resin portion 4 provided between the first middle core portion 31*f* and the second middle core portion 31*s* constitutes the gap portion 3*g*. The resin of the molded resin portion 4 is the same as the resin of the composite material described above. The resin of the molded resin portion 4 may contain a ceramic filler, similarly to the composite material.

Other Aspects

Although not shown, the reactor 1 may include at least any of a case, an adhesive layer, and a holding member, for example. The case houses the assembly of the coil 2 and the magnetic core 3. The assembly in the case may be embedded in a sealing resin portion. An adhesive layer fixes the assembly to a mounting surface, fixes the assembly to an inner bottom surface of the case, and fixes the case to a mounting surface, for example. A holding member is provided between the coil 2 and the magnetic core 3 and ensures insulation between the coil 2 and the magnetic core 3.

Actions and Effects

The reactor 1 of the present embodiment includes the first core piece 3*f* and the second core piece 3*s* that are likely to suppress damage to the insulating coating of the coil 2 during the manufacturing process, and thus the reactor 1 is excellent in terms of productivity. During the manufacturing process, soft magnetic particles exposed from the end face 351 may become detached due to contact between the flowing raw material for the molded resin portion 4 and the end face 351 of the gate mark 35. Since the end face 351 of the gate mark 35 is located inside the recessed portion 34, detached soft magnetic particles can accumulate in the bottom portion 341 of the recessed portion 34, or more specifically the space formed by the side wall portion 352 of the gate mark 35, the bottom portion 341 of the recessed portion 34, and the inner wall portion 342 of the recessed portion 34. This thus suppresses the case where detached soft magnetic particles flow into the coil 2 along with the flow of the raw material for the molded resin portion 4. Therefore, rubbing between detached soft magnetic particles and the coil 2 is suppressed.

Second Embodiment

[Reactor]

Figure 6:
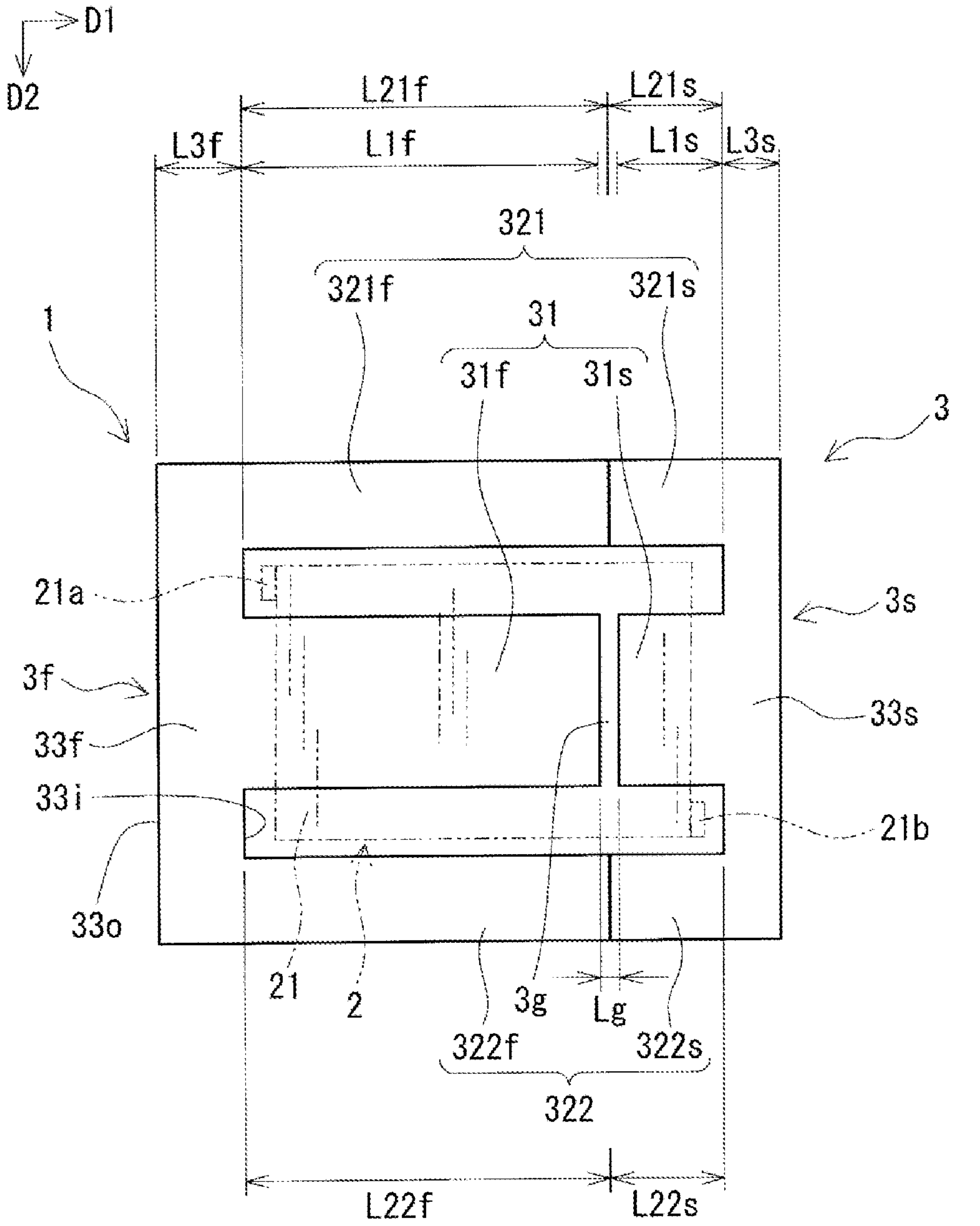
FIG. 6 is a top view showing an overview of a reactor according to a second embodiment.

A reactor 1 of a second embodiment will be described below with reference to FIG. 6. Similarly to the reactor 1 of the first embodiment, in the reactor 1 of the present embodiment, the combination of the first core piece 3*f* and the second core piece 3*s* is of the E-E type. The reactor 1 of the present embodiment is different from the reactor 1 of the first embodiment in that the shape of the first core piece 3*f* and the shape of the second core piece 3*s* are asymmetric, and the first core piece 3*f* and the second core piece 3*s* are constituted by different materials. The following description focuses on differences from the first embodiment. Descriptions may be omitted for configurations and effects similar to those of the first embodiment.

[Magnetic Core]

(First Core Piece and Second Core Piece)

The sizes of the first core piece 3*f* and the second core piece 3*s* are different from each other. Specifically, there is a portion where the length of the core portions of the first core piece 3*f* along the first direction D1 is different from the length of the core portions of the second core piece 3*s* along the first direction D1. The length L1*f* of the first middle core portion 31*f* is longer than the length L1*s* of the second middle core portion 31*s*. The length L21*f* of the first side core portion 321*f* is longer than the length L21*s* of the first side core portion 321*s*. The length L22*f* of the second side core portion 322*f* is longer than the length L22*s* of the second side core portion 322*s*. The length L3*s* of the second end core portion 33*s* is shorter than the length L3*f* of the first end core portion 33*f*.

The first core piece 3*f* and the second core piece 3*s* of the present embodiment are constituted by different materials. Being constituted by different materials includes not only the case in which the materials of the individual constituent elements of the core portions are different, but also the case in which the content ratios of constituent elements are different even though the individual constituent elements are constituted by the same material. For example, even in the case where the first core piece 3*f* and the second core piece 3*s* are constituted by a composite material molded body, if at least either the soft magnetic powder or the resin constituting the composite material include different materials, or if the materials constituting the soft magnetic powder and the resin are the same but the content ratios of the materials constituting the soft magnetic powder and the resin are different, the materials are considered to be different from each other.

The powder compact is obtained by subjecting the above-described soft magnetic powder to compression molding. Compared with a composite material molded body, the powder compact can have a higher percentage of the soft magnetic powder in the core portion. For this reason, it is easy to improve a magnetic characteristic of the powder compact. Examples of magnetic characteristics include saturation magnetic flux density and relative magnetic permeability. Also, a powder compact includes a smaller amount of resin and a larger amount of soft magnetic powder than a molded body of composite material, and therefore has excellent heat dissipation. The magnetic powder content in the powder compact is 85% by volume or more and 99.99% by volume or less, for example. This content ratio is a value when the powder compact is 100% by volume. The content of the soft magnetic powder in the powder compact is considered to be equivalent to the ratio of the area of the soft magnetic powder to the area of the cross-section of the molded body, similarly to the content of the soft magnetic powder in the composite material molded body described above. The content of the soft magnetic powder in the molded body is determined as described above.

In the present embodiment, the first core piece 3*f* is constituted by a composite material molded body, and the second core piece 3*s* is constituted by a powder compact. Although not shown, the first end core portion 33*f* has the above-described recessed portion and gate mark, similarly to the first embodiment. Unlike the first embodiment, the second end core portion 33*s* does not have the recessed portion and the gate mark.

The preferred range of relative magnetic permeability of the first core piece 3*f* is as described above. The relative magnetic permeability of the second core piece 3*s* may be 100 or more and 500 or less, and particularly 150 or more and 500 or less.

Actions and Effects

The reactor 1 of the present embodiment can achieve effects similar to those of the first embodiment, and enables easily adjusting the inductance and heat dissipation without providing the gap portion 3*g* with the long length Lg. The reason for this is that the first core piece 3*f* and the second core piece 3*s* are constituted by different materials. In the reactor 1 of the present embodiment, the second core piece 3*s* is constituted by a powder compact having a relatively high thermal conductivity, and thus the heat dissipation can be easily improved.

Third Embodiment

[Reactor]

Figure 7:
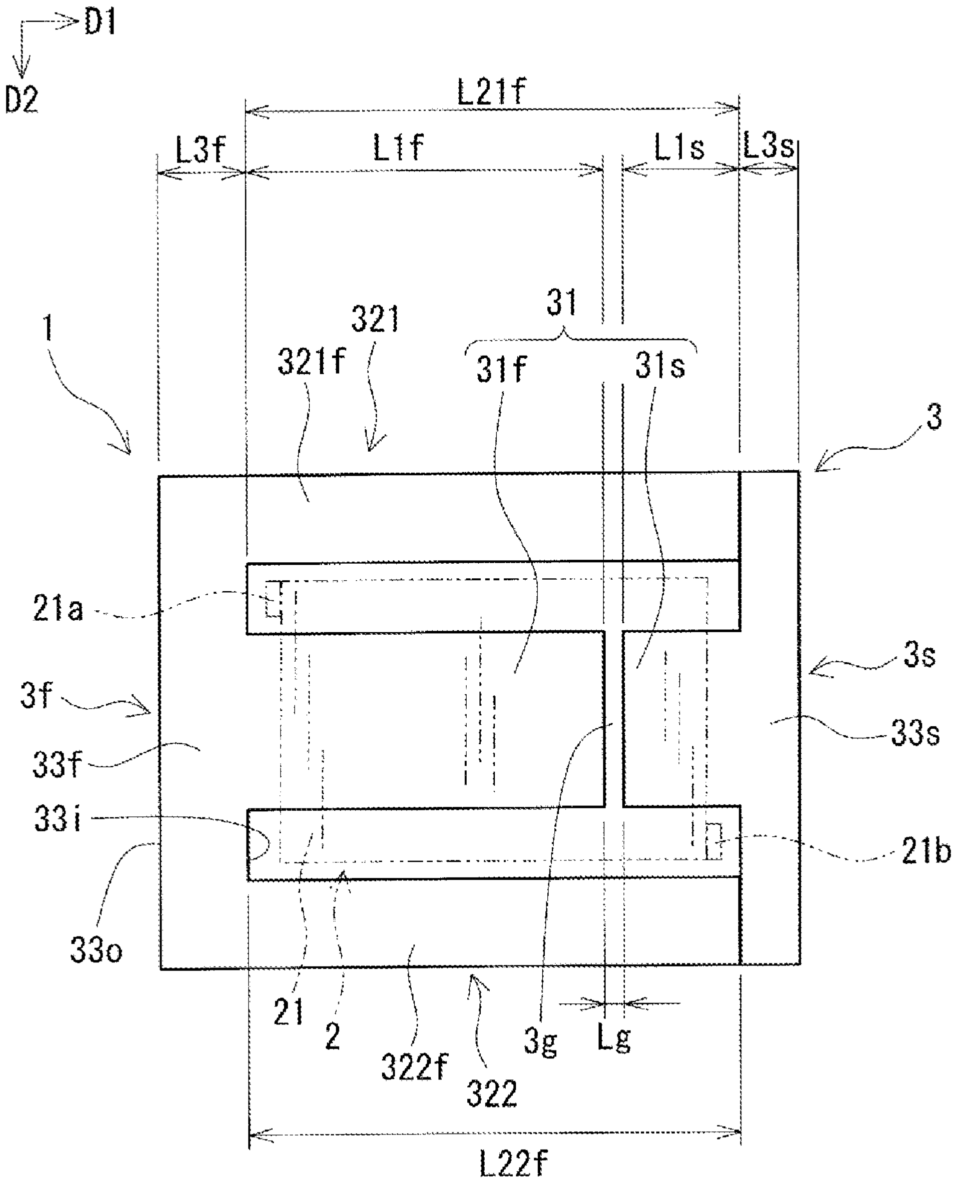
FIG. 7 is a top view showing an overview of a reactor according to a third embodiment.

A reactor 1 of a third embodiment will be described below with reference to FIG. 7. The reactor 1 of the present embodiment is different from the reactor 1 of the second embodiment in that the combination of the first core piece 3*f* and the second core piece 3*s* is of the E-T type. The following description mainly focuses on differences from the second embodiment. Descriptions of configurations similar to those of the second embodiment may be omitted.

[Magnetic Core]

(First Core Piece)

The first core piece 3*f*, which is E-shaped, is a molded body in which the first middle core portion 31*f*, the first side core portion 321, the second side core portion 322, and the first end core portion 33*f* are integrated with each other. The first middle core portion 31*f* constitutes a portion of the middle core portion 31. The first side core portion 321 is constituted by only the first side core portion 321*f*. The second side core portion 322 is constituted by only the second side core portion 322*f*. The first core piece 3*f* is constituted by a composite material molded body, similarly to the first embodiment. Although not shown, the first end core portion 33*f* has the above-described recessed portion and gate mark, similarly to the first embodiment.

The length L1*f* of the first middle core portion 31*f* is shorter than the length L21*f* of the first side core portion 321*f* and the length L22*f* of the second side core portion 322*f*. The length L21*f* and the length L22*f* are the same. The length L21*f* and the length L22*f* in the present embodiment are longer than the length of the winding portion 21 in the axial direction. The length L1*f* of the present embodiment is longer than the length L1*s* of the second middle core portion 31*s*, which will be described later. As an alternative to the present embodiment, the length L1*f* and the length L1*s* may be the same.

(Second Core Piece)

The second core piece 3*s*, which is T-shaped, is a molded body in which the second middle core portion 31*s* and the second end core portion 33*s* are integrated with each other. The second middle core portion 31*s* constitutes the remaining portion of the middle core portion 31. The second core piece 3*s* is constituted by a powder compact, similarly to the second embodiment. Similarly to the second embodiment, the second end core portion 33*s* does not have the recessed portion and the gate mark.

The first core piece 3*f* and the second core piece 3*s* are combined such that the end face of the first side core portion 321*f* and the end face of the second side core portion 322*f* are in contact with the inward face of the second end core portion 33*s*. Since the above-described length relationship is satisfied through this combining, a gap is provided between the end face of the first middle core portion 31*f* and the end face of the second middle core portion 31*s*.

(Gap Portion)

Similarly to the first embodiment, the gap portion 3*g* is constituted by a portion of the molded resin portion (not shown). The gap portion 3*g* is provided inside the winding portion 21, similarly to the second embodiment. The gap portion 3*g* is provided between the end face of the first middle core portion 31*f* and the end face of the second middle core portion 31*s*.

Actions and Effects

The reactor 1 of the present embodiment can achieve effects similar to the reactor 1 of the second embodiment.

Fourth Embodiment

[Reactor]

A reactor 1 of a fourth embodiment will be described below with reference to FIGS. 8 to 11. The reactor 1 of the present embodiment is different from the reactor 1 of the first embodiment in that the coil 2 includes a first winding portion 221 and a second winding portion 222, and the combination of the first core piece 3*f* and the second core piece 3*s* is of the U-U type. The following description focuses on differences from the first embodiment. Descriptions of configurations similar to those of the first embodiment may be omitted.

[Coil]

Figure 8:
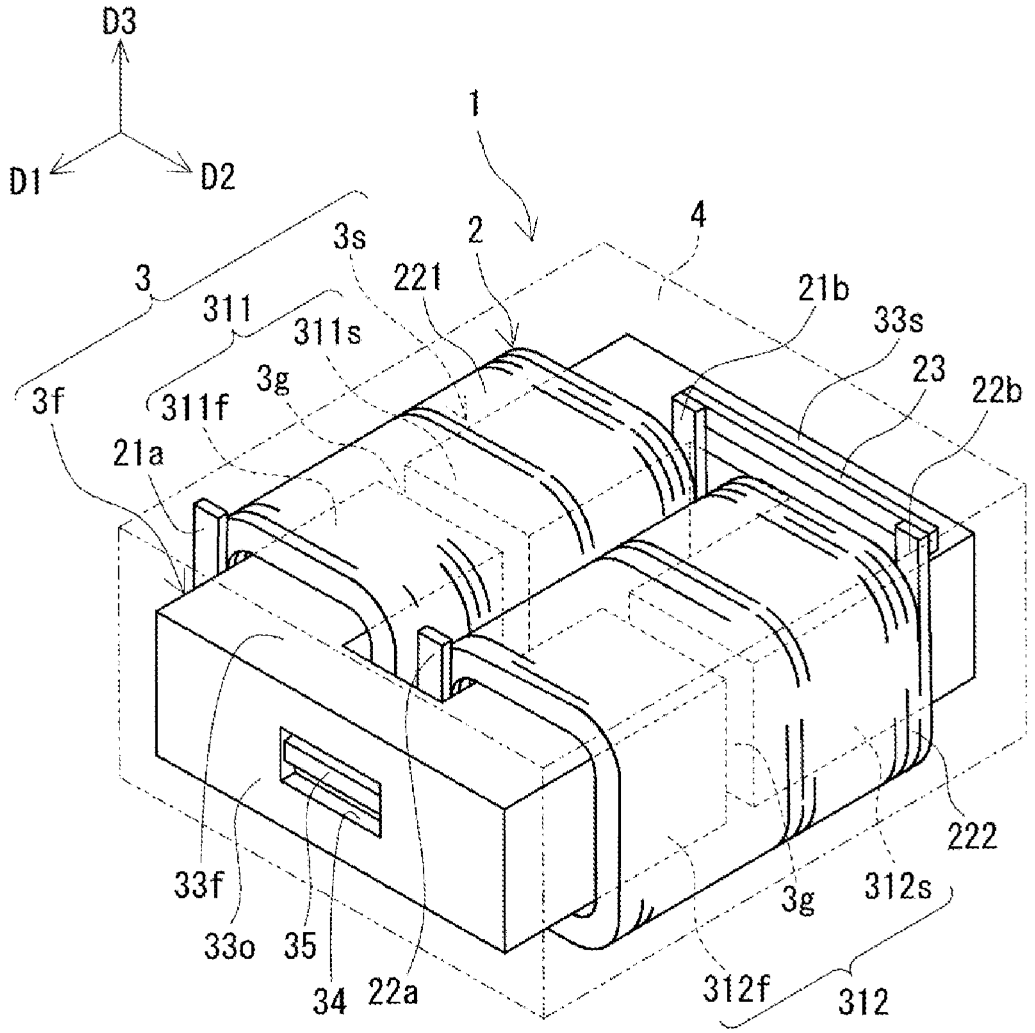
FIG. 8 is a perspective view showing an overview of a reactor according to a fourth embodiment.
Figure 9:
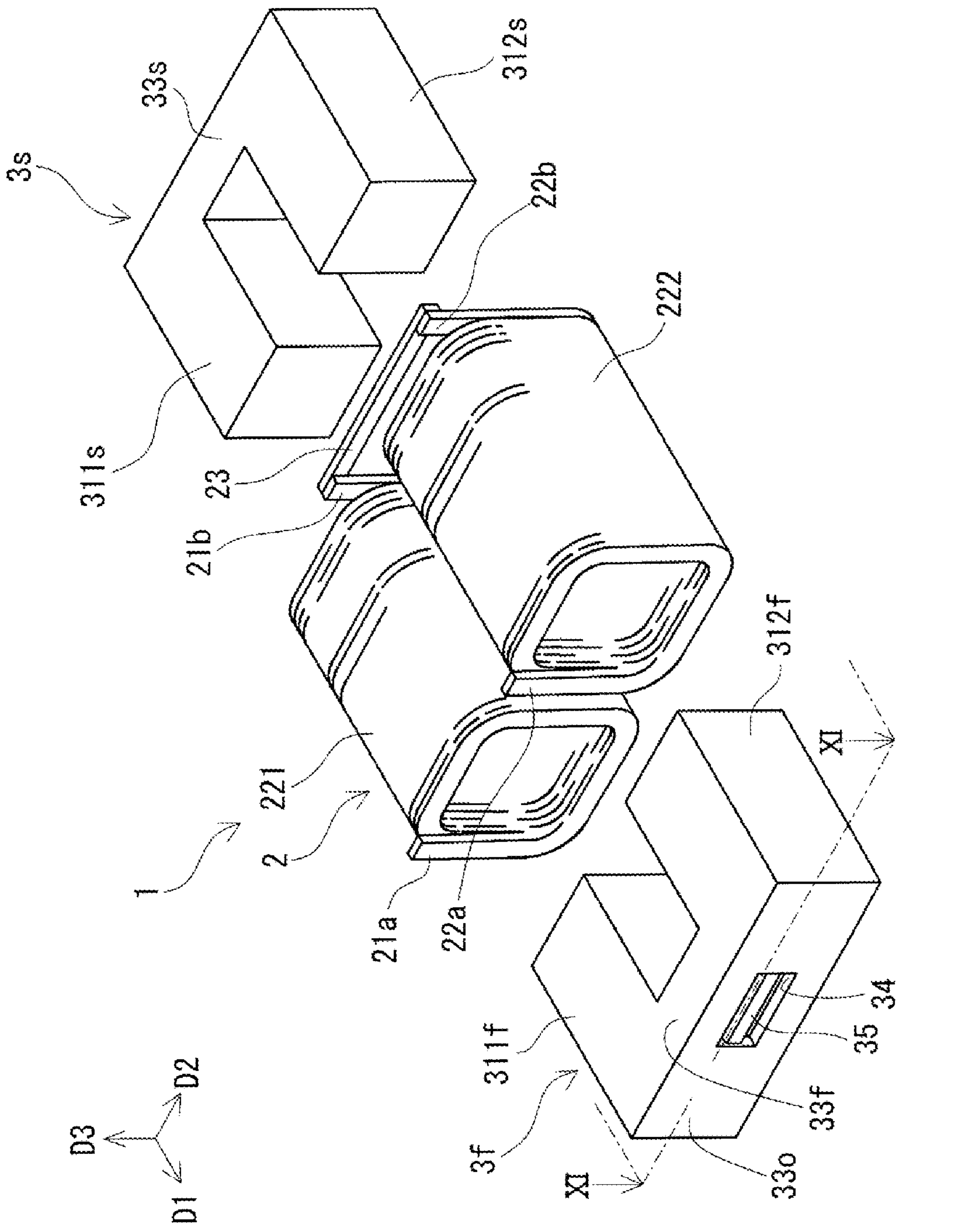
FIG. 9 is a perspective view schematically showing an exploded state of the reactor according to the fourth embodiment.

As shown in FIGS. 8 and 9, the first winding portion 221 and the second winding portion 222 are aligned such that their axes are parallel to each other. The first winding portion 221 and the second winding portion 222 have a rectangular tubular shape. Due to the reactor 1 of the present embodiment including the first winding portion 221 and the second winding portion 222, when compared with the reactor 1 including one winding portion 21 in the first embodiment, the length along the axial direction of the first winding portion 221 and the second winding portion 222 can be shorter while having the same winding portion cross-sectional area and the same number of turns.

In the present embodiment, the first winding portion 221 and the second winding portion 222 are configured by winding separate coil wires into a spiral shape. The coil wires are configured as previously described. The first winding portion 221 and the second winding portion 222 can be electrically connected as follows, for example. In the present embodiment, a coupling member 23 independent of the first winding portion 221 and the second winding portion 222 is connected to the conductors of the coil wires of the first winding portion 221 and the second winding portion 222. The coupling member 23 is constituted by the same member as the coil wires, for example. As an alternative to the present embodiment, the conductors of the coil wires in the first winding portion 221 and the second winding portion 222 may be directly connected to each other. In the case where the conductors are directly connected to each other, the end of the coil wire of the first winding portion 221 is bent and drawn toward the end of the coil wire of the second winding portion 222, for example. Welding or pressure welding can be used to connect the conductors to the coupling member 23 or connect the conductors to each other.

As an alternative to the present embodiment, the first winding portion 221 and the second winding portion 222 may be configured by winding a single coil wire into a spiral without a joint. In that case, the first winding portion 221 and the second winding portion 222 are electrically connected to each other via a connection portion formed by bending a portion of the coil wire into a U shape on one end side of the coil 2 in the axial direction.

The external device described above is connected to the exposed conductor wires of a first end portion 21*a* of the first winding portion 221 and a first end portion 22*a* of the second winding portion 222. The coupling member 23 described above is connected to the exposed conductor wires of a second end portion 21*b* of the first winding portion 221 and a second end portion 22*b* of the second winding portion 222.

[Magnetic Core]

As shown in FIG. 8, the magnetic core 3 of the present embodiment includes a first middle core portion 311, a second middle core portion 312, and a first end core portion 33*f*, and a second end core portion 33*s*. In the magnetic core 3, the direction along the axial direction of the first winding portion 221 is the first direction D1, the direction in which the first middle core portion 311 and the second middle core portion 312 are side by side is the second direction D2, and the direction orthogonal to the first direction D1 and the second direction D2 is the third direction D3.

(First Middle Core Portion and Second Middle Core Portion)

The first middle core portion 311 has a portion located inside the first winding portion 221. The second middle core portion 312 has a portion located inside the second winding portion 222. The first middle core portion 311 and the second middle core portion 312 are shaped as quadrangular prisms.

Figure 10:
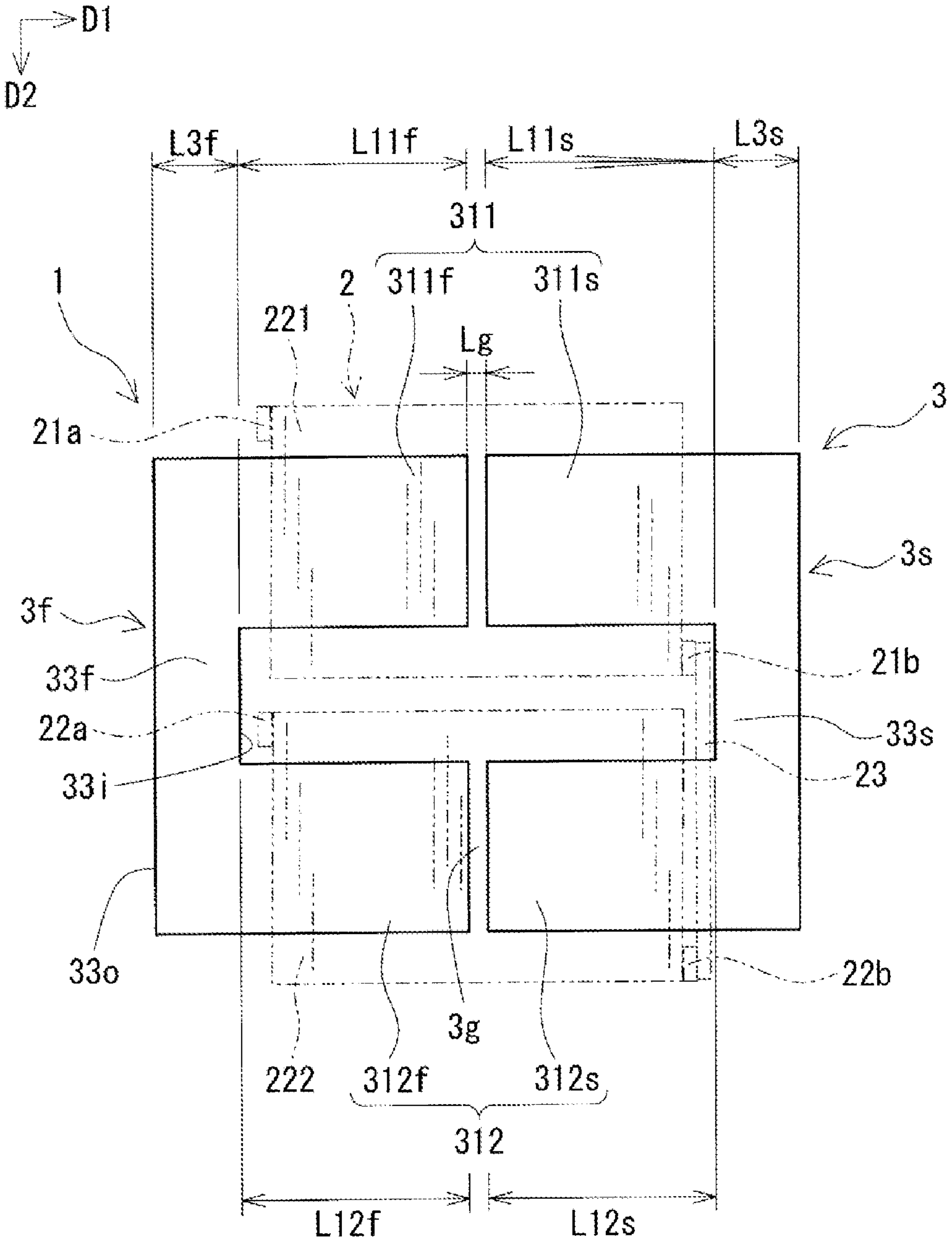
FIG. 10 is a top view showing an overview of the reactor according to the fourth embodiment.
Figure 11:
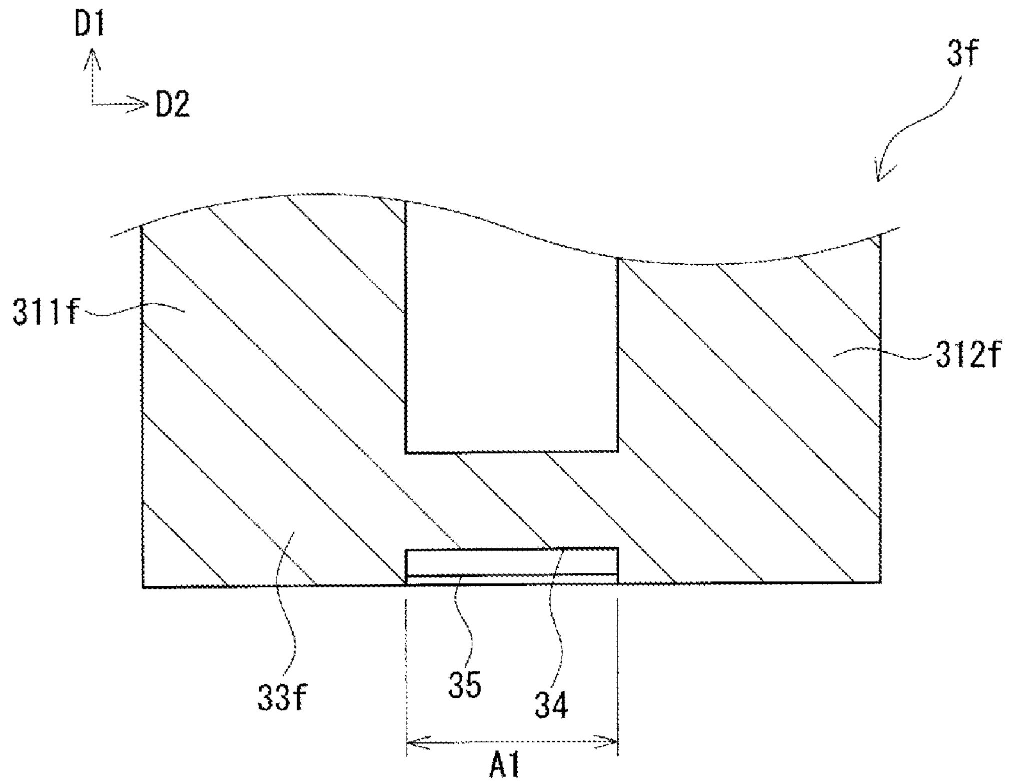
FIG. 11 is a cross-sectional view taken along XI-XI in FIG. 9.

As shown in FIG. 10, the length of the first middle core portion 311 along first direction D1 and the length of the second middle core portion 312 along first direction D1 are the same as each other. The length of the first middle core portion 311 along the first direction D1 and the length of the second middle core portion 312 along the first direction D1 are substantially equivalent to the length of the first winding portion 221 along the axial direction. The length Lg of the gap portion 3*g* along the first direction D1, which will be described later, is not included in the length of the first middle core portion 311 along the first direction D1 and the length of the second middle core portion 312 along the first direction D1.

The length of the first middle core portion 311 along the first direction D1 is a sum length L11*f*+L11*s*, that is to say the sum of the length L11*f* of the first middle core portion 311*f* along the first direction D1 and the length L11*s* of the first middle core portion 311*s* along the first direction D1, which will be described later. The length of the second middle core portion 312 along the first direction D1 is a sum length L12*f*+L12*s*, that is to say the sum of the length L12*f* of the second middle core portion 312*f* along the first direction D1 and the length L12*s* of the second middle core portion 312*s* along the first direction D1, which will be described later.

The first middle core portion 311 may be constituted by two core portions, namely the first middle core portion 311*f* and the first middle core portion 311*s*, as in the present embodiment. The first middle core portion 311 may be constituted by only the first middle core portion 311*f* as in a sixth embodiment described later with reference to FIG. 13. The second middle core portion 312 may be constituted by two core portions, namely the second middle core portion 312*f* and the second middle core portion 312*s*, as in the present embodiment. Although not shown, the second middle core portion 312 may be constituted by only the second middle core portion 312*f*.

(First End Core Portion and Second End Core Portion)

The first end core portion 33*f* faces both the first end portion of the first winding portion 221 and the first end portion of the second winding portion 222. The second end core portion 33*s* faces both the second end portion of the first winding portion 221 and the second end portion of the second winding portion 222.

(First Core Piece and Second Core Piece)

The magnetic core 3 is a compound body that is a combination of a first core piece 3*f* and a second core piece 3*s*. In the present embodiment, the combination of the first core piece 3*f* and the second core piece 3*s* is of the U-U type. Since the reactor 1 can be constructed by the first core piece 3*f* and the second core piece 3*s* being combined with the first winding portion 221 and the second winding portion 222 along the first direction D1, the ease of work in manufacturing is excellent. In the present embodiment, the shape of the first core piece 3*f* and the shape of the second core piece 3*s* are symmetrical.

The U-shaped first core piece 3*f* of the present embodiment includes a first middle core portion 311*f*, a second middle core portion 312*f*, and a first end core portion 33*f*. The first middle core portion 311*f* constitutes a portion of the first middle core portion 311. The second middle core portion 312*f* constitutes a portion of the second middle core portion 312. The first core piece 3*f* is a molded body in which a first middle core portion 311*f*, a second middle core portion 312*f*, and a first end core portion 33*f* are integrated with each other. The outer peripheral faces of the first middle core portion 311*f* and the second middle core portion 312*f* are connected to the inward face 33*i* of the first end core portion 33*f*. The first middle core portion 311*f* and the second middle core portion 312*f* are provided at the two ends of the first end core portion 33*f* in the second direction D2.

As described above, the second core piece 3*s* of the present embodiment, which is U-shaped and symmetrical with the first core piece 3*f*, has a first middle core portion 311*s*, a second middle core portion 312*s*, and a second end core portion 33*s*. The first middle core portion 311*s* constitutes the remaining portion of the first middle core portion 311. The second middle core portion 312*s* constitutes the remaining portion of the second middle core portion 312. The second core piece 3*s* is a molded body in which the second middle core portion 312*s*, the second end core portion 33*s*, and the first middle core portion 311*s* are integrated with each other. The positions and connections of the core portions in the second core piece 3*s* are the same as the positions and connections of the core portions in the first core piece 3*f* described above.

In the present embodiment, the first core piece 3*f* and the second core piece 3*s* are combined such that a gap is provided between the end face of the first middle core portion 311*f* and the end face of the first middle core portion 311*s*, and a gap is provided between the end face of the second middle core portion 312*f* and the end face of the second middle core portion 312*s*. The length of the gaps along the first direction D1 corresponds to the length Lg of the gap portion 3*g* along the first direction D1.

As an alternative to the present embodiment, the first core piece 3*f* and the second core piece 3*s* may be combined such that the end face of the first middle core portion 311*f* of the first core piece 3*f* is in contact with the end face of the first middle core portion 311*s* of the second core piece 3*s*, and the end face of the second middle core portion 312*f* of the first core piece 3*f* is in contact with the end face of the second middle core portion 312*s* of the second core piece 3*s*.

In the present embodiment, the first core piece 3*f* and the second core piece 3*s* are each constituted by a composite material molded body, similarly to the first embodiment. In other words, as shown in FIGS. 8 and 9, the first end core portion 33*f* and the second end core portion 33 each include the recessed portion 34 and the gate mark 35, similarly to the first embodiment.

(Gate Mark)

The gate mark 35 of the present embodiment may be provided so as to overlap the center of the outward face 33*o* in the second direction D2. Due to the gate mark 35 being provided so as to overlap the center of the second direction D2 of the outward face 33*o*, the raw material for the composite material molded body is likely to spread uniformly over the first middle core portion 311*f* and the second middle core portion 312*f* in the manufacturing process. At least part of the gate mark 35 may be provided in the first region A1 shown in FIG. 11. The first region A1 is a region of the outward face 33*o* of the first end core portion 33*f* that corresponds to the gap between the first middle core portion 311*f* and the second middle core portion 312*f*. The region that corresponds to the above gap is the region of the outward face 33*o* between a first virtual outer peripheral face and a second virtual outer peripheral face. The first virtual outer peripheral face is a face obtained by extending the outer peripheral surface of the first middle core portion 311*f* in the first direction D1. The second virtual outer peripheral face is a face obtained by extending the outer peripheral surface of the second middle core portion 312*s* in the first direction D1. If the length of the gate mark 35 is greater than or equal to the total length of the first region A1, it is possible to improve the effect of facilitating uniform spreading of the raw material for the composite material molded body. In the present embodiment, the length of the gate mark 35 is the length over the entirety of the first region A1.

(Size)

The first core piece 3*f* and the second core piece 3*s* have the same size. The following describes the size of the first core piece 3*f* as a representative. The length L11*f* of the first middle core portion 311*f* and the length L12*f* of the second middle core portion 312*f* are the same. The length of the first middle core portion 311*f* along the second direction D2 and the length of the second middle core portion 312*f* along the second direction D2 are the same. The length of the first middle core portion 311*f* along the third direction D3 and the length of the second middle core portion 312*f* along the third direction D3 are the same.

(Gap Portion)

Similarly to the first embodiment, the gap portion 3*g* is constituted by a part of the molded resin portion (not shown). Similarly to the first embodiment, the gap portion 3*g* is arranged inside the coil 2. Specifically, the gap portion 3*g* is arranged at two locations. A first gap portion 3*g* is arranged between the end face of the first middle core portion 311*f* and the end face of the first middle core portion 311*s*, inside the first winding portion 221. A second gap portion 3*g* is arranged between the end face of the second middle core portion 312*f* and the end face of the second middle core portion 312*s*, inside the second winding portion 222.

Actions and Effects

The reactor 1 of the present embodiment can achieve effects similar to those of the first embodiment.

Fifth Embodiment

[Reactor]

Figure 12:
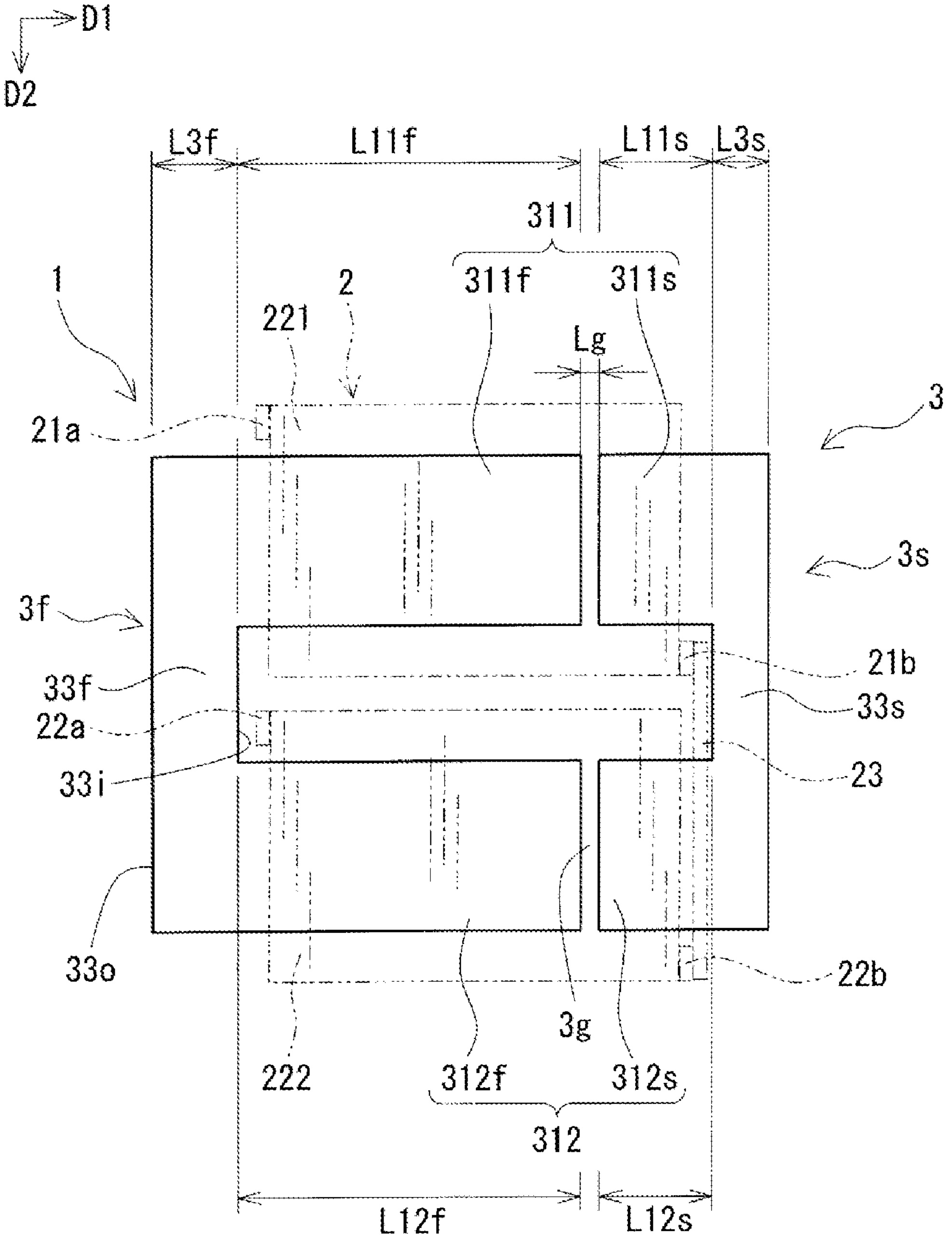
FIG. 12 is a top view showing an overview of a reactor according to a fifth embodiment.

A reactor 1 according to a fifth embodiment will be described below with reference to FIG. 12. In the reactor 1 of the present embodiment, the combination of the first core piece 3*f* and the second core piece 3*s* is of the U-U type, similarly to the reactor 1 of the fourth embodiment. The reactor 1 of the present embodiment is different from the reactor 1 of the fourth embodiment in that the shape of the first core piece 3*f* and the shape of the second core piece 3*s* are asymmetric, and the first core piece 3*f* and the second core piece 3*s* are constituted by different materials. The following description will mainly focus on differences from the fourth embodiment. Descriptions of configurations similar to those of the fourth embodiment may be omitted.

[Magnetic Core]

(First Core Piece and Second Core Piece)

The size of the first core piece 3*f* and the size of the second core piece 3*s* are different from each other. Specifically, there is a portion where the length of the core portions of the first core piece 3*f* along the first direction D1 is different from the length of the core portions of the second core piece 3*s* along the first direction D1. The length L11*f* of the first middle core portion 311*f* is longer than the length L11*s* of the first middle core portion 311*s*. The length L12*f* of the second middle core portion 312*f* is longer than the length L12*s* of the second middle core portion 312*s*. The length L11*f* and the length L12*f* are the same. The length L11*s* and the length L12*s* are the same. The length L3*s* of the second end core portion 33*s* along the first direction D1 is shorter than the length L3*f* of the first end core portion 33*f* along the first direction D1.

In the present embodiment, the first core piece 3*f* is constituted by a composite material molded body, similarly to the fourth embodiment. Unlike the fourth embodiment, in the present embodiment, the second core piece 3*s* is constituted by a powder compact. Although not shown, the first core piece 3*f* has the recessed portion and the gate mark described above, similarly to the fourth embodiment. Unlike the fourth embodiment, the second core piece 3*s* does not have the recessed portion and the gate mark.

Actions and Effects

The reactor 1 of the present embodiment can achieve effects similar to the reactor 1 of the second embodiment.

Sixth Embodiment

[Reactor]

Figure 13:
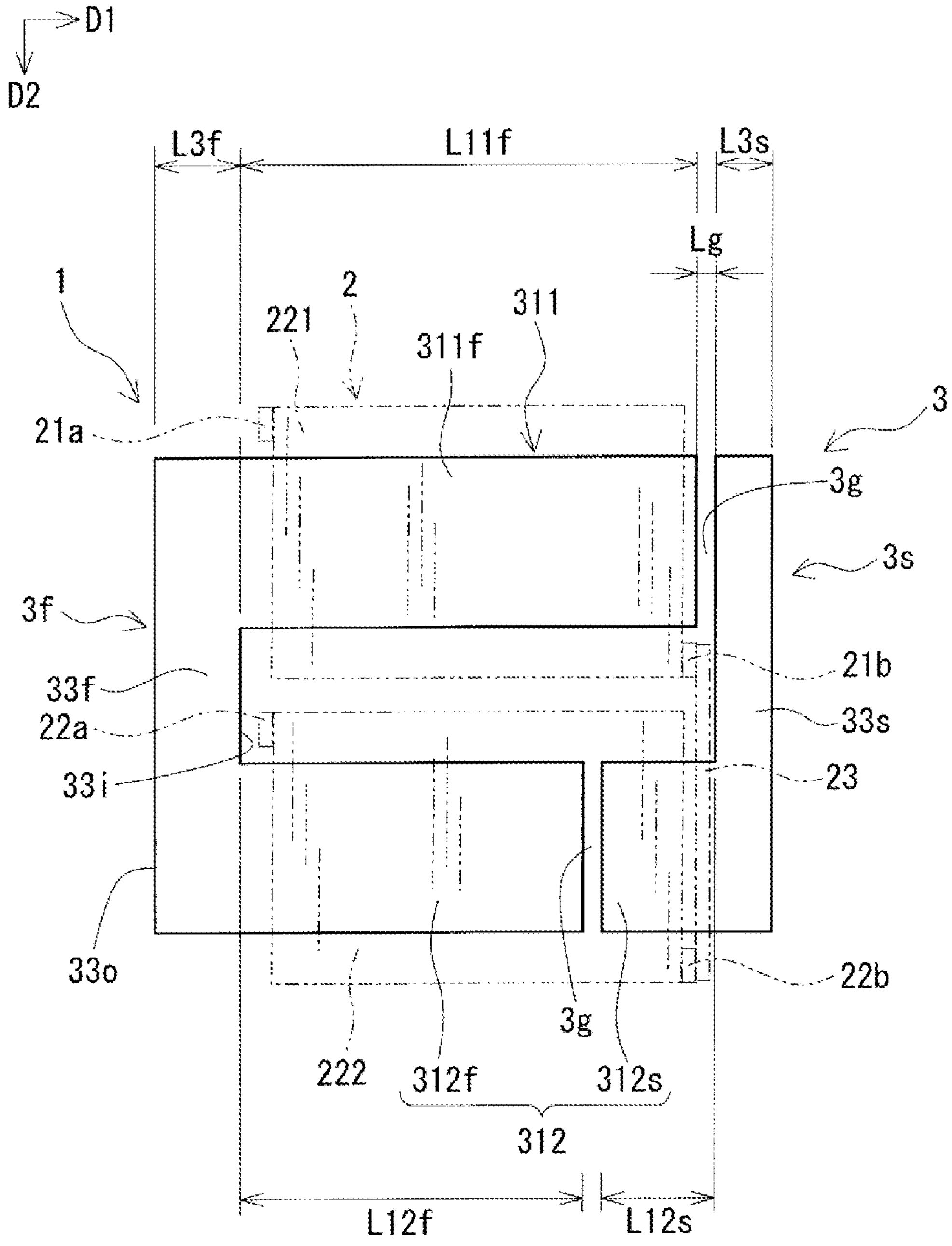
FIG. 13 is a top view showing an overview of a reactor according to a sixth embodiment.

A reactor 1 according to a sixth embodiment will be described below with reference to FIG. 13. The reactor 1 of the present embodiment is different from the fifth embodiment in that the combination of the first core piece 3*f* and the second core piece 3*s* is of the J-L type. The following description will focus on differences from the fifth embodiment. Descriptions of configurations similar to those of the fifth embodiment may be omitted.

[Magnetic Core]

(First Core Piece)

The first core piece 3*f*, which is J-shaped, is a molded body in which the first middle core portion 311, the second middle core portion 312*f*, and the first end core portion 33*f* are integrated with each other. The first middle core portion 311 is constituted by only the first middle core portion 311*f*. The second middle core portion 312*f* constitutes a portion of the second middle core portion 312. The length L11*f* of the first middle core portion 311*f* is the same as the sum length of the length L12*f* of the second middle core portion 312*f* and the length L12*s* of the second middle core portion 312*s*. The first core piece 3*f* is constituted by a composite material molded body, similarly to the fifth embodiment. Although not shown, the first end core portion **33*f*** has the recessed portion and the gate mark described above, similarly to the fifth embodiment.

(Second Core Piece)

The second core piece **3*s*, which is L-shaped, is a molded body in which the second middle core portion 312*s* and the second end core portion 33*s* are integrated with each other. The second middle core portion 312*s* constitutes the remaining portion of the second middle core portion 312. The second core piece 3*s* is constituted by a powder compact, similarly to the fifth embodiment. Similarly to the fifth embodiment, the second end core portion 33*s*** does not have the recessed portion and the gate mark.

The first core piece **3*f* and the second core piece 3*s* are combined such that a gap is provided between the end face of the first middle core portion 311*f* and the end face of the second end core portion 33*s*, and a gap is provided between the end face of the second middle core portion 312*f* and the end face of the second middle core portion 312*s***. The lengths of the gaps are equivalent to each other.

(Gap Portion)

Similarly to the fifth embodiment, the gap portion **3*g* is constituted by a part of the molded resin portion (not shown). Unlike the fifth embodiment, the gap portion 3*g* is arranged outside the first winding portion 221 and inside the second winding portion 222. The first gap portion 3*g* is arranged between the end face of the first middle core portion 311*f* and the end face of the second end core portion 33*s*. The second gap portion 3*g* is arranged between the end face of the second middle core portion 312*f* and the end face of the second middle core portion 312*s***.

Actions and Effects

The reactor 1 of the present embodiment can achieve effects similar to the reactor 1 of the fifth embodiment.

Seventh Embodiment

[Converter and Power Conversion Device]

The reactor 1 according to any of the first to sixth embodiments can be used for an application in which the following power conduction conditions are satisfied. Examples of the power conduction conditions include the maximum DC current, the average voltage, and the operating frequency. The maximum DC current is about 100 A or more and 1000 A or less. The average voltage is about 100 V or more and 1000 V or less. The operating frequency is about 5 kHz or more and 100 kHz or less. The reactor 1 according to any of the first to sixth embodiments can be typically used as a component of a converter for installation in a vehicle 1200 shown in FIG. 14, or a component of a power conversion device that includes that converter. The vehicle 1200 is an electric automobile or a hybrid automobile.

Figure 14:
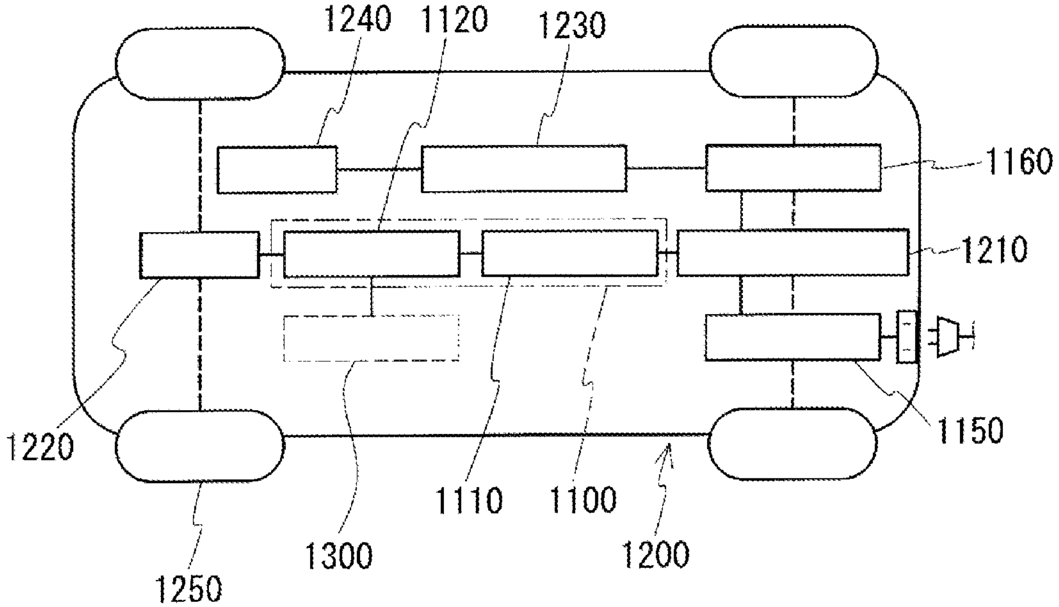
FIG. 14 is a configuration diagram schematically showing a power supply system of a hybrid automobile.

The vehicle 1200 includes a main battery 1210, a power conversion device 1100, and a motor 1220, as shown in FIG. 14. The power conversion device 1100 is connected to the main battery 1210. The motor 1220 is driven by electric power supplied from the main battery 1210 and used for traveling. The motor 1220 is typically a three-phase AC motor. The motor 1220 drives wheels 1250 during traveling, and functions as a generator during regeneration. In the case of a hybrid automobile, the vehicle 1200 includes an engine 1300 in addition to the motor 1220. Although an inlet is shown as the charging location of the vehicle 1200 in FIG. 14, an aspect is also possible in which a plug is included.

The power conversion device 1100 includes a converter 1110 and an inverter 1120. The converter 1110 is connected to the main battery 1210. The inverter 1120 performs conversion between direct current and alternating current. The inverter 1120 is connected to the converter 1110. During traveling of the vehicle 1200, the converter 1110 shown in this example steps up the input voltage from the main battery 1210 from approximately 200 V to 300 V to approximately 400 V to 700 V, and supplies the stepped-up power to the inverter 1120. During regeneration, the converter 1110 steps down the input voltage that is output from the motor 1220 via the inverter 1120 to a DC voltage suitable for the main battery 1210, and charges the main battery 1210 with the DC voltage. The input voltage is a DC voltage. During traveling of the vehicle 1200, the inverter 1120 converts the direct current boosted by the converter 1110 into a predetermined alternating current, and supplies the alternating current to the motor 1220, and during regeneration, the inverter 1120 converts the alternating current output from the motor 1220 into direct current, and outputs the direct current to the converter 1110.

Figure 15:
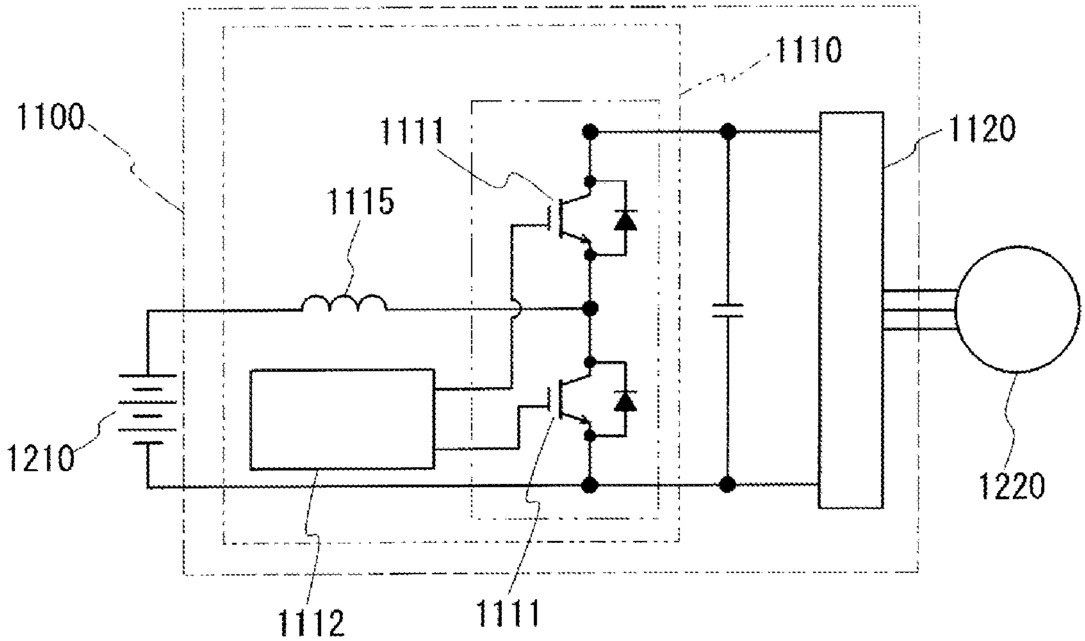
FIG. 15 is a circuit diagram showing an overview of an example of a power conversion device that includes a converter.

The converter 1110 includes a plurality of switching elements 1111, a drive circuit 1112, and a reactor 1115 as shown in FIG. 15. The drive circuit 1112 controls the operation of the switching elements 1111. The converter 1110 converts performs input voltage conversion by repeatedly turning the switching elements ON and OFF. Input voltage conversion means stepping up and stepping down in this case. A power device such as a field effect transistor or an insulated gate bipolar transistor is used for the switching elements 1111. The reactor 1115 has a function of utilizing the property of a coil that attempts to prevent change in the current flowing through a circuit to smooth change in the current when the current increases or decreases due to the switching operation. The reactor 1115 is the reactor 1 according to any of the first to sixth embodiments. Due to including the reactor 1 that is excellent in terms of productivity, an improvement in productivity can be anticipated for the power conversion device 1100 and the converter 1110 as well.

The vehicle 1200 includes a power supply device converter 1150 and an auxiliary power supply converter 1160, in addition to the converter 1110. The power supply device converter 1150 is connected to the main battery 1210. The auxiliary power supply converter 1160 is connected to a sub battery 1230, which serves as a power source for auxiliary devices 1240, and is connected to the main battery 1210. The auxiliary power supply converter 1160 converts high voltage from the main battery 1210 to low voltage, and the converter 1110 typically performs DC-DC conversion. The power supply device converter 1150 and the auxiliary power supply converter 1160 perform AC-DC conversion. Some power supply converters 1150 perform DC-DC conversion. The reactor of the power supply device converter 1150 and the auxiliary power supply converter 1160 has a configuration similar to that of the reactor 1 according to any of the first to sixth embodiments, and the size, shape, and the like of the reactor can be changed appropriately. Also, the reactor 1 according to any of the first to sixth embodiments can be used in a converter that performs conversion on input power but performs only either stepping up or stepping down.

The present invention is not intended to be limited to these examples, but rather is indicated by the scope of the claims, and is intended to include all modifications within the meaning and scope of equivalents of the scope of the claims.

In the case where one winding portion is provided as in the first to third embodiments, the combination of the first core portion and the second core portion may be of the E-I type, the E-U type, the F-F type, the F-L type, or the T-U type, although such types are not illustrated. In the case where two winding portions are provided as in the fourth to sixth embodiments, the combination of the first core portion and the second core portion may be of the U-I type, the J-J type, or the L-L type, although such types are not illustrated.

In the second, third, fifth, and sixth embodiments, the second core portion may be constituted by a laminate body. The laminate body is formed by laminating a plurality of magnetic thin plates. The magnetic thin plates have an insulating coating. The magnetic thin plates are electromagnetic steel plates, for example.

LIST OF REFERENCE NUMERALS

1 reactor
2 coil
21 winding portion, 221 first winding portion, 222 second winding portion
21*a*, 22*a* first end portion, 21*b*, 22*b* second end portion
23 coupling member
3 magnetic core
3*f* first core piece, 3*s* second core piece
31 middle core portion
31*f* first middle core portion, 31*s* second middle core portion
311 first middle core portion
311*f* first middle core portion, 311*s* first middle core portion
312 second middle core portion
312*f* second middle core portion, 312*s* second middle core portion
321 first side core portion
321*f* first side core portion, 321*s* first side core portion
322 second side core portion
322*f* second side core portion, 322*s* second side core portion
33*f* first end core portion, 33*s* second end core portion
33*i* inward face, 33*o* outward face
34 recessed portion, 341 bottom portion, 342 inner wall portion
35 gate mark, 351 end face, 352 side wall portion
3*g* gap portion
4 molded resin portion
A1 first region
D1 first direction, D2 second direction, D3 third direction
L1*f*, L1*s*, L11*f*, L11*s*, L12*f*, L12*s* length
L21*f*, L21*s* length, L22*f*, L22*s* length
L3*f*, L3*s* length, Lg length
1100 power conversion device, 1110 converter
1111 switching element, 1112 drive circuit
1115 reactor, 1120 inverter
1150 power supply device converter, 1160 auxiliary power supply converter
1200 vehicle, 1210 main battery
1220 motor, 1230 sub battery
1240 auxiliary device, 1250 wheel, 1300 engine

What is claimed is:

1. A core piece constituted by a molded body of a composite material in which a soft magnetic powder is dispersed in a resin, the core piece comprising:

an end core portion configured to face an end face of a coil, wherein the end core portion includes:

a recessed portion provided outside the coil; and a gate mark provided at a bottom portion of the recessed portion, and an end face of the gate mark is located inside the recessed portion.

2. The core piece according to claim 1, wherein the end core portion further includes:

an inward face configured to face an end face of the coil; and an outward face provided on a side opposite to the inward face, and the recessed portion and the gate mark are provided in the outward face.

3. The core piece according to claim 2, further comprising:

a middle core portion having a portion configured to be arranged inside the coil, wherein the recessed portion and the gate mark are at least partially provided in a first region of the outward face, the first region being a region of the outward face corresponding to the middle core portion.

4. The core piece according to claim 3, wherein the core piece is E-shaped, the core piece comprises:

the end core portion;

the middle core portion; and a first side core portion and a second side core portion that are arranged outward of the coil on opposite sides of the middle core portion, and the recessed portion and the gate mark have a length extending over an entire length of the outward face in a width direction, the width direction being a direction in which the middle core portion, the first side core portion, and the second side core portion are side by side.

5. The core piece according to claim 2, wherein the core piece is U-shaped or J-shaped, the core piece further comprises:

a first middle core portion having a portion configured to be arranged inside a first winding portion of the coil; and a second middle core portion having a portion configured to be arranged inside a second winding portion of the coil, and the recessed portion and the gate mark are at least partially provided in a first region of the outward face, the first region being a region of the outward face corresponding to a gap between the first middle core portion and the second middle core portion.

6. A reactor including a coil and a magnetic core, the reactor comprising:

a molded resin portion covering at least a portion of the magnetic core, wherein the magnetic core includes the core piece according to claim 1.

7. The reactor according to claim 6, wherein the magnetic core is a compound body that is a combination of a first core piece and a second core piece, and at least either the first core piece or the second core piece is the core piece according to claim 1.

8. The reactor according to claim 6, wherein the core piece has a relative magnetic permeability of 5 or more and 50 or less.

9. A converter comprising the reactor according to claim 6.

10. A power conversion device comprising the converter according to claim 9.

* * * * *